(12) United States Patent
Potenza et al.

(10) Patent No.: US 12,081,267 B2
(45) Date of Patent: Sep. 3, 2024

(54) METHOD AND SYSTEM FOR DEMULTIPLEXING AND DEMODULATING SIGNALS MULTIPLEXED IN THE VARIABLE ORBITAL ANGULAR MOMENTUM

(71) Applicant: UNIVERSITA' DEGLI STUDI DI MILANO, Milan (IT)

(72) Inventors: Marco Potenza, Milan (IT); Bruno Paroli, Milan (IT); Mirko Siano, Milan (IT)

(73) Assignee: UNIVERSITA' DEGLI STUDI DI MILANO, Milan (IT)

( * ) Notice: Subject to any disclaimer, the term of this patent is extended or adjusted under 35 U.S.C. 154(b) by 93 days.

(21) Appl. No.: 17/603,051

(22) PCT Filed: Apr. 9, 2020

(86) PCT No.: PCT/IB2020/053395
§ 371 (c)(1),
(2) Date: Oct. 12, 2021

(87) PCT Pub. No.: WO2020/208570
PCT Pub. Date: Oct. 15, 2020

(65) Prior Publication Data
US 2022/0190915 A1 Jun. 16, 2022

(30) Foreign Application Priority Data
Apr. 12, 2019 (IT) .................. 102019000005706

(51) Int. Cl.
*H04B 10/118* (2013.01)
*G02F 2/00* (2006.01)
(Continued)

(52) U.S. Cl.
CPC .......... *H04B 10/118* (2013.01); *G02F 2/008* (2021.01); *H04B 7/18515* (2013.01);
(Continued)

(58) Field of Classification Search
CPC .... H04B 10/11; H04B 10/541; H04B 10/118; H04B 7/18515; G02F 2/008; H04J 14/02
See application file for complete search history.

(56) References Cited

U.S. PATENT DOCUMENTS 9,413,448 B2 * 8/2016 Ashrafi ............ H04B 10/25752
2012/0081120 A1 4/2012 Elgort et al.
(Continued)

FOREIGN PATENT DOCUMENTS

CN 109039468 A 12/2018
CN 109274431 A 1/2019

OTHER PUBLICATIONS

Zhang et al. "Detecting the Orbital Angular Momentum of Electro-Magnetic Waves Using Virtual Rotational Antenna", Scientific Reports, 7:4585, published Jul. 4, 2017.
(Continued)

*Primary Examiner* — Casey L Kretzer
(74) *Attorney, Agent, or Firm* — ArentFox Schiff LLP; Michael Fainberg

(57) ABSTRACT

A method for demultiplexing and demodulating (in particular, "locally" demultiplexing and demodulating) amplitude-modulated signals grouped by means of orbital angular momentum multiplexing is described. The method involves demultiplexing and demodulating information a(t), b(t) modulated on each of a first modulated beam Fm1 and at least one second modulated beam Fm2, based on phase difference values $\Delta P_{ab}$ and $\Delta R$ detected by beam detectors located downstream of an interferometric structure 40 to which two portions of the electromagnetic beam carrying the
(Continued)

modulated channels are provided as inputs, multiplexed in the orbital angular momentum variable. There is also described a corresponding system 100 for demultiplexing and demodulating amplitude-modulated signals capable of implementing the aforesaid method.

20 Claims, 9 Drawing Sheets

(51) Int. Cl.
  *H04B 7/185*   (2006.01)
  *H04B 10/11*   (2013.01)
  *H04B 10/54*   (2013.01)
  *H04J 14/02*   (2006.01)

(52) U.S. Cl.
  CPC ........... *H04B 10/11* (2013.01); *H04B 10/541* (2013.01); *H04J 14/02* (2013.01)

(56) References Cited

U.S. PATENT DOCUMENTS

2017/0343750 A1* 11/2017 Ashrafi .................... H04J 14/04
2018/0234285 A1* 8/2018 Djordjevic ............ H04L 27/345
2019/0198999 A1* 6/2019 Ashrafi .................. H01Q 25/04

OTHER PUBLICATIONS

Mohammadi et al. "Orbitual Angular Momentum in Radio: Measurement Methods", Radio Science, vol. 45, RS4007, published Jul. 16, 2010, pp. 1-14.

Xie et al. "Mode Measurement of a Dual-Mode Radio Frequency Orbitual Angular Momentum Beam by Circular Phase Gradient Method", IEEE Antennas and Wireless Propagation Letters, vol. 16, 2017, pp. 1143-1146.

\* cited by examiner

(12) United States Patent
US 12,081,267 B2

METHOD AND SYSTEM FOR DEMULTIPLEXING AND DEMODULATING SIGNALS MULTIPLEXED IN THE VARIABLE ORBITAL ANGULAR MOMENTUM

CROSS-REFERENCE TO RELATED APPLICATIONS

This application is a National Phase Application of PCT International Application No. PCT/IB2020/053395, having an International Filing Date of Apr. 9, 2020 which claims priority to Italian Application No. 102019000005706 filed Apr. 12, 2019, each of which is hereby incorporated by reference in its entirety.

TECHNOLOGICAL BACKGROUND OF THE INVENTION

Field of Application

The present invention generally relates to the technical field of the transmission and reception of electromagnetic beams, in particular optical/laser and microwave beams, with detection of the orbital angular momentum of such beams, as well as to the field of telecommunications based on electromagnetic beams, in particular optical/laser and microwave beams, orbital angular momentum-modulated and/or -multiplexed.

The present invention relates, in particular, to the demultiplexing and demodulating of signals multiplexed in the orbital angular momentum variable (i.e., orbital-angular-momentum-multiplexed signals).

Description of the Prior Art

The theory of the propagation of electromagnetic beams, in particular laser and microwave beams, has relatively recently shown the existence of an orbital angular momentum (Orbital Angular Momentum).

The orbital angular momentum, from a traditional point of view, is a concept related to the different transversal modes of beam propagation.

This may also be considered indicative of the fact that the propagation front of an Orbital Angular Momentum (OAM) wave is not simply planar, but has an evolution which may be represented by helical surfaces.

In other words, the Poynting vector, as well as the wave vector, is no longer simply parallel to the direction of propagation, but twists about it.

The orbital angular momentum is treated, from a quantum point of view, through a further quantum number, which is distinct from the spin.

Recently, beams having orbital angular momentums different from 0, and capable of taking different values, have also been experimentally demonstrated.

The "orbital angular momentum" variable, due to the features thereof mentioned above, is particularly difficult to be detected and characterized when the detector is illuminated only by a limited portion of the radiation beam, even if very distant from the singularity. In fact, there are no reliable systems and methods allowing to detect the orbital angular momentum of an electromagnetic beam, for example, a laser, received by means of a local measure, i.e., having available only a limited portion of the beam incident on the detector, even if very distant from the singularity.

On the other hand, the need is felt to detect the orbital angular momentum of a beam received for various reasons, including, for example, the characterization of the beam and the utilization of the angular momentum variable for telecommunications purposes.

Such a need is not currently met by known technical solutions through local measures.

The Applicant has also identified a promising possibility of utilizing the orbital angular momentum variable as an additional degree of freedom, advantageously usable both for modulating signals and for multiplexing the same.

However, the background art in the technical field taken into consideration does not offer reliable telecommunications solutions based on orbital angular momentum multiplexing and/or modulation. The need to for such solutions is therefore particularly felt.

In addition, in the important field of telecommunications applications, the need is felt to have methods and systems which are capable of effectively demodulating and demultiplexing a plurality of signals transmitted on two or more amplitude-modulated and angular-momentum-multiplexed electromagnetic beams.

SUMMARY OF THE INVENTION

In light of the above, it is the object of the present invention to provide a method for demultiplexing and demodulating amplitude-modulated signals grouped by means of multiplexing in the orbital angular momentum variable, such as to allow to at least partially obviate the drawbacks complained herein above with reference to the prior art, and to fulfill the above mentioned needs particularly felt in the technical field taken into account.

Such an object is achieved by a method according to claim 1.

Further embodiments of such a method are defined by claims 2-17.

The present invention further relates to a system for demultiplexing and demodulating amplitude-modulated signals grouped by means of multiplexing in the orbital angular momentum variable, capable of carrying out the aforesaid method.

BRIEF DESCRIPTION OF THE DRAWINGS

Further features and advantages of the aforesaid methods and systems according to the invention will become apparent from the following description of preferred embodiments, given by way of indicative and non-limiting examples, with reference to the accompanying drawings, in which.

DETAILED DESCRIPTION

Figure 1:
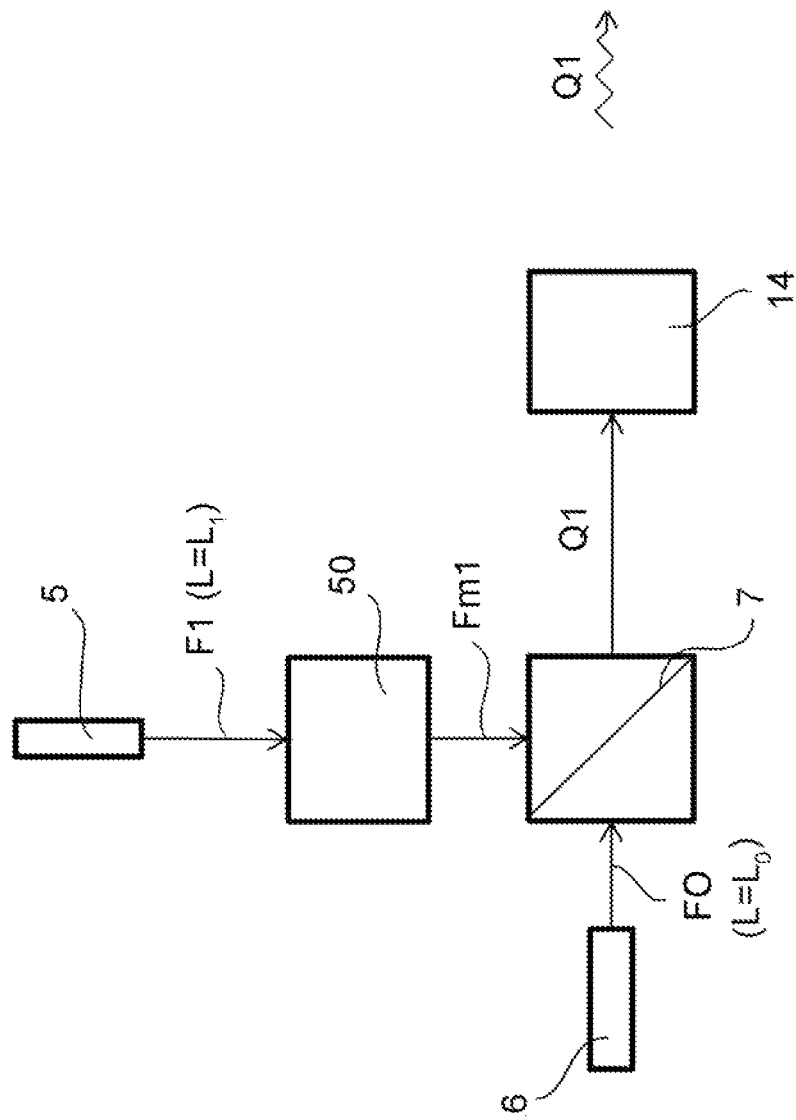
FIG. 1 shows a simplified diagram of a transmitting portion of an embodiment of the system for transmitting and receiving an electromagnetic radiation beam, in accordance with the invention; such a FIG. 1 simultaneously shows some steps of the corresponding method.

With reference to FIGS. 1 to 6, a method for transmitting and receiving an electromagnetic radiation beam is described, adapted to determine an orbital angular momentum of the received electromagnetic radiation beam.

The method, first of all, comprises the steps of generating at least one main electromagnetic radiation beam F1 characterized by a first orbital angular momentum $L_1$, by a first spectrum in a first frequency band, and by a first beam radius of curvature, and of generating a reference electromagnetic radiation beam F0, characterized by a second orbital angular momentum $L_0$, by a second spectrum in a second frequency band which is distinct from the aforesaid first frequency band, and by a second beam radius of curvature substantially coinciding with the aforesaid first beam radius of curvature.

It should be noted that the aforesaid characterization based on a first $L_1$ and a second orbital angular momentum $L_0$ may be correspondingly described also in terms of topological charge $(I_1, I_0)$, since an angular momentum L and a topological charge I are linked by the relationship:

$$L=(I*h)/2\pi \text{ (where } h \text{ is the Planck constant).}$$

The method therefore involves generating a composite electromagnetic radiation beam Q1, consisting of the superposition of the aforesaid at least one main beam F1 and reference beam F0, and transmitting the composite electromagnetic radiation beam Q1 thus generated.

The method further comprises the steps of receiving the aforesaid composite electromagnetic radiation beam Q1, by means of a first beam detector 1 located in a first position, to generate a first composite beam electrical signal D1, representative of the electric and/or magnetic field and/or of the intensity of the electromagnetic radiation of the composite beam in such a first position; and receiving the aforesaid composite electromagnetic radiation beam Q1, by means of a second beam detector 2 located in a second different position with respect to the aforesaid first position, to generate a second composite beam electrical signal D2, representative of the electric and/or magnetic field and/or of the intensity of the received electromagnetic radiation of the composite beam in such a second position.

The method further comprises the steps of performing a frequency discrimination of the first composite beam electrical signal D1 to obtain a first main beam electrical signal P1, representative of the electric and/or magnetic field and/or of the intensity due to the main beam in said first position, and a first reference beam electrical signal R1, representative of the electric and/or magnetic field and/or of the intensity due to the reference beam in the first position; and performing a frequency discrimination of the second composite beam electrical signal D2 to obtain a second main beam electrical signal P2, representative of the electric and/or magnetic field and/or of the intensity due to the main beam in the second position, and a second reference beam electrical signal R2, representative of the electric and/or magnetic field and/or of the intensity due to the reference beam in the second position.

The method finally involves determining the orbital angular momentum $L_1$ of the main electromagnetic radiation beam and/or the spatial phase variation of the main electromagnetic radiation beam due to the main beam orbital angular momentum $L_1$, based on the aforesaid first main beam electrical signal P1, second main beam electrical signal P2, first reference beam electrical signal R1 and second reference beam electrical signal R2.

In accordance with an embodiment of the method, the step of determining comprises determining a first phase difference value ΔP corresponding to the difference between the phase of the first main beam electrical signal P1 and the phase of the second main beam electrical signal P2; furthermore, determining a second phase difference value ΔR corresponding to the difference between the phase of the first reference beam electrical signal R1 and the phase of the second reference beam electrical signal R2; then, subtracting the second phase difference value ΔR, divided by a second wave number k', from the first phase difference value ΔP, divided by a first wave number k, to obtain a difference value (Q2=ΔP/k−ΔR/k') which is independent of positional inclination conditions between the aforesaid first detector and second detector, deriving from the relative position of the two detectors with respect to the beam propagation, said difference value being independent of phase variations due to disturbances suffered by the transmitted composite beam before reception; and determining then the orbital angular momentum of the main electromagnetic radiation beam based on the aforesaid obtained difference value (Q2=ΔP/k−ΔR/k').

The first wave number k is the wave number corresponding to the main beam, defined as k=2π/λ, λ being the wavelength of the aforesaid main beam belonging to the aforesaid first frequency band. The second wave number k' is the wave number corresponding to the reference beam, defined as k'=2π/λ', λ' being the wavelength of the aforesaid reference beam belonging to the aforesaid second frequency band.

The definition "positional inclination" (or "positional tilt") is meant to indicate the angle formed between the straight line joining the two detectors and the (orthogonal) projection thereof on the plane orthogonal to the beam propagation axis.

In accordance with a particular implementation example, the step of determining the orbital angular momentum of the main electromagnetic radiation beam comprises determining the orbital angular momentum of the main electromagnetic radiation beam based on the formula:

$$\Delta P/k - \Delta R/k' \propto (L_1/k - L_0/k')(\theta_2 - \theta_1)$$

where $\theta_1$ is the angular position of the first detector measured on the plane orthogonal to the composite beam propagation vector containing the first detector; $\theta_2$ is the angular position of the second detector measured on the plane orthogonal to the composite beam propagation vector containing the second detector; ∝ indicates proportionality.

In accordance with an implementation option, the step of determining a first phase difference value ΔP comprises comparing the phase of the first main beam electrical signal P1 with the phase of the second main beam electrical signal P2, by means of a first phase comparator 3; the step of determining a second phase difference value ΔR comprises comparing the phase of the first reference beam electrical signal R1 with that of the second reference beam electrical signal R2, by means of a second phase comparator 4.

In accordance with another implementation option, the step of determining a first phase difference value ΔP comprises performing correlation operations between the first main beam electrical signal P1 and the second main beam electrical signal P2; and the step of determining a second phase difference value ΔR comprises performing correlation operations between the first reference beam electrical signal R1 and the second reference beam electrical signal R2.

In accordance with an embodiment of the method, the orbital angular momentum of the reference beam is known at all times.

In accordance with an implementation option, the orbital angular momentum of the reference beam takes the constant value $L_0=0$.

In accordance with an embodiment of the method, the first position of the first detector 1 and the second position of the second detector 2 are fixed and constant, and are distinct from the position of the singularity point of the beam.

In accordance with another embodiment of the method, the first position of the first detector 1 and/or the second position of the second detector 2 are movable, and the reciprocal relationship between the aforesaid first position and second position is known at all times.

In accordance with an implementation option, the second frequency band is substantially monochromatic.

In accordance with a particular implementation option, the second frequency band is adjacent to the first frequency band.

In accordance with possible embodiments of the method, the steps of performing a frequency discrimination of the first or second composite beam electrical signal comprise performing a frequency filtering, or performing a frequency separation by means of heterodyne techniques or other frequency separation methods.

In accordance with an embodiment of the method, the at least one main electromagnetic radiation beam is not modulated.

In accordance with other embodiments of the method, the at least one main electromagnetic radiation beam is amplitude-modulated, and/or phase-modulated, and/or frequency-modulated, and/or orbital angular momentum-modulated.

In accordance with an embodiment of the method, all the transmitted and received electromagnetic beams, previously mentioned, are optical beams and/or laser beams.

In the following, a detailed example of implementation of the method is given, with the relevant physical-mathematical analysis.

In the following description, and in FIGS. 1 and 2, the points in which the different signals are present (first composite beam electrical signal D1, second composite beam electrical signal D2, first main beam electrical signal P1, first reference beam electrical signal R1, second main beam electrical signal P2, second reference beam electrical signal of) are indicated, for simplicity, with the same name as the respective signal.

As already observed, the composite beam Q1 is generated by at least one beam with an orbital angular momentum $L=L_1$ (other than 0), defined herein as main beam F1, superimposed on a beam with an angular momentum $L=L_0$, defined herein as reference beam F0.

The main beam may be modulated or unmodulated. The reference beam has a frequency band which is not overlapping the frequency band of the main beam. The frequency band of the reference beam is preferably quasi-monochromatic and adjacent to the frequency band of the main beam.

The reference beam substantially has the same curvature and the same propagation vector as the main beam. The reference beam preferably has a topological charge $I_0=0$, which also implies an orbital angular momentum $L_0=0$.

The recognition of the spatial phase difference generated by the main beam with an orbital angular momentum $L_1$ is obtained by using two detectors in positions arbitrary in the space with the exception of the singularity point of the vortex.

As known, the expression "singularity of the vortex" means a point in the vortex in which the electromagnetic field results to be reduced to zero and in which the phase of the field cannot be determined.

In case the main beam is not modulated, the electric field $E_1$ or the related signal on the first detector 1 (indicated as D1 in FIG. 2) may be represented by the following analytical formula:

$$E(\vec{x}_1,t)=A_1 e^{i\omega t}e^{il_1\theta_1}e^{i\varphi(\vec{x}_1)}e^{i\alpha(\vec{x}_1)}+B_1 e^{i\omega' t}e^{il_0\theta_1}e^{i\varphi'(\vec{x}_1)}e^{i\alpha'(\vec{x}_1)}$$

where t is time, $A_1$ and $B_1$ are non-zero arbitrary amplitudes, $I_1$ is the topological charge of the main beam, $I_0$ is the topological charge of the reference beam, $\theta_1$ is the angular position of the detector measured on the plane orthogonal to the composite beam propagation vector containing the first detector 1, $\varphi(\vec{x}_1)$ and $\varphi'(\vec{x}_1)$ are arbitrary phases due to the positional inclination, and $\alpha(\vec{x}_1)$ and $\alpha'(\vec{x}_1)$ are arbitrary phases due to disturbances of the propagating wavefront.

Similarly, the electric field $E_2$ or the related signal on the second detector 2 (indicated as D2 in FIG. 2) may be represented by the following analytical formula:

$$E(\vec{x}_2,t)=A_2 e^{i\omega t}e^{il_1\theta_2}e^{i\varphi(\vec{x}_2)}e^{i\alpha(\vec{x}_2)}+B_2 e^{i\omega' t}e^{il_0\theta_1}e^{i\varphi'(\vec{x}_2)}e^{i\alpha'(\vec{x}_2)}$$

where t is time, $A_2$ and $B_2$ are non-zero arbitrary amplitudes, $I_1$ is the topological charge of the main beam, $I_0$ is the topological charge of the reference beam, $\theta_2$ is the angular position of the detector 2 measured on the plane orthogonal to the composite beam propagation vector containing the detector 2, $\varphi(\vec{x}_2)$ and $\varphi'(\vec{x}_2)$ are arbitrary phases due to the positional inclination, and $\alpha(\vec{x}_2)$ and $\alpha'(\vec{x}_2)$ are arbitrary phases due to disturbances of the propagating wavefront.

Figure 6:
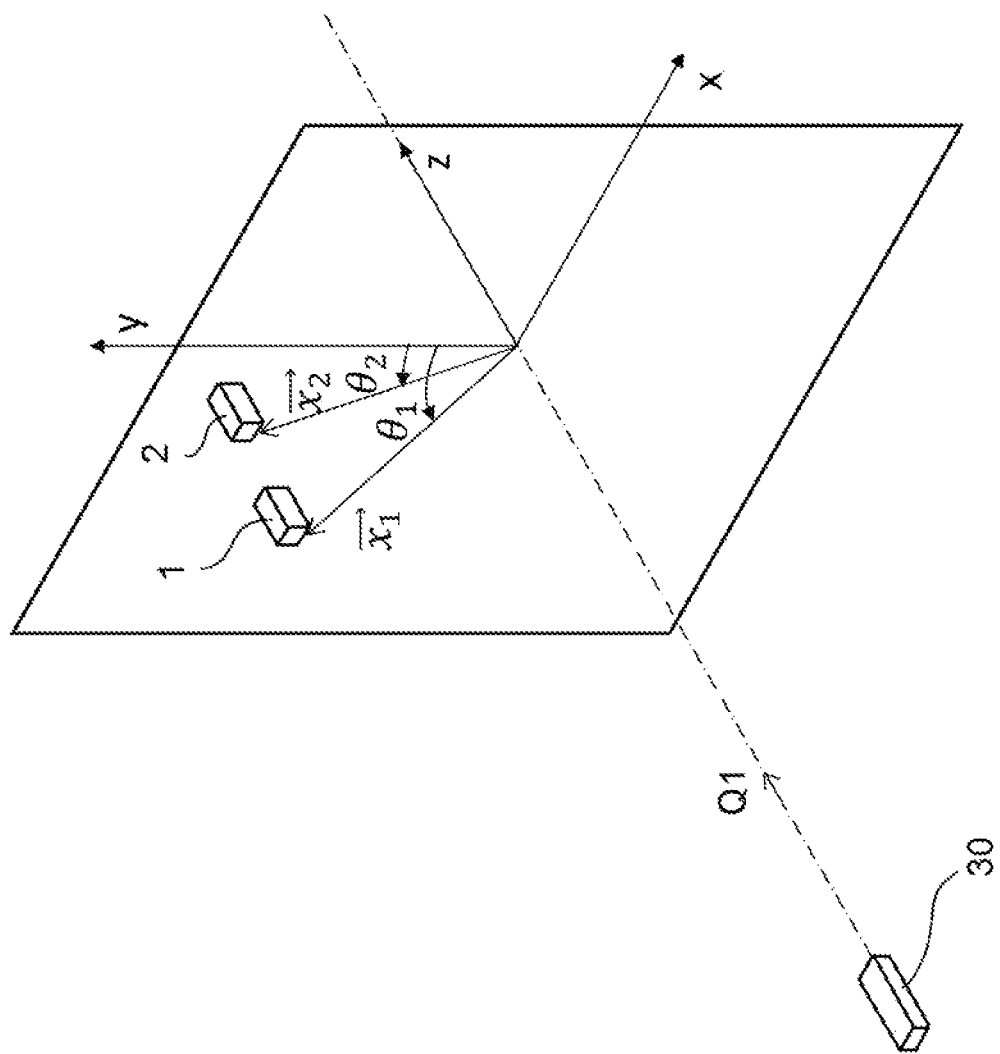
FIG. 6 depicts some geometric quantities used in the illustration of the system.

As a further illustration of the geometric quantities defined above, FIG. 6 shows, by means of a dashed line, the propagation axis z of the composite beam Q1 generated by the composite beam generation system, already previously described (indicated in FIG. 6 with reference 30). FIG. 6 also indicates the plane xy orthogonal to the propagation axis z, the position vectors $\vec{x}_1$ and $\vec{x}_2$ of the two detectors 1 and 2, respectively, and the aforesaid angular positions of the two detectors $\theta_1$ and $\theta_2$, respectively.

The field or the related signal is separated in frequency by means of various possible techniques, which are known per se, so as to have in R1 and R2 the fields or the related signals in the frequency band of the reference beam only, and in P1 and P2 the fields or the related signals in the frequency band of the main beam only.

The following analytical expressions may therefore be obtained:

in R1: $E(\vec{x}_1,t)=B_1 e^{i\omega' t}e^{il_1\theta_1}e^{i\varphi(\vec{x}_1)}e^{i\alpha(\vec{x}_1)}$ in R2: $E(\vec{x}_2,t)=B_2 e^{i\omega' t}e^{il_0\theta_2}e^{i\varphi(\vec{x}_2)}e^{i\alpha(\vec{x}_2)}$ in P1: $E(\vec{x}_1,t)=A_1 e^{i\omega' t}e^{il_1\theta_1}e^{i\varphi(\vec{x}_1)}e^{i\alpha(\vec{x}_1)}$ in P2: $E(\vec{x}_2,t)=A_2 e^{i\omega' t}e^{il_1\theta_2}e^{i\varphi(\vec{x}_2)}e^{i\alpha(\vec{x}_2)}$ The second phase comparator 4 provides a quantity proportional to the phase difference of the fields and of the related signals between R1 and R2:

$$\Delta R \propto l_0(\theta_2-\theta_1)+\varphi'(\vec{x}_2)-\varphi'(\vec{x}_1)+\alpha'(\vec{x}_2)-\alpha'(\vec{x}_1) \quad 5$$

The first phase comparator 3 provides a quantity proportional to the phase difference of the fields and of the related signals between P1 and P2:

$$\Delta P \propto l_1(\theta_2-\theta_1)+\varphi(\vec{x}_2)-\varphi(\vec{x}_1)+\alpha(\vec{x}_2)-\alpha(\vec{x}_1)$$

Since the main beam has a curvature substantially equal to the reference beam curvature and a propagation direction substantially coinciding with the reference beam propagation direction, the phase difference related to the inclinations (tilts) is, with an excellent approximation:

$$\frac{\varphi(\vec{x}_2)}{k} - \frac{\varphi(\vec{x}_1)}{k} = \frac{\varphi'(\vec{x}_2)}{k'} - \frac{\varphi'(\vec{x}_1)}{k'}$$

Since the distortion phenomena due to the propagation are very similar for the main beam and the reference beam (superimposed upon transmission in the composite beam), the phase difference related to the distortion is, with an excellent approximation:

$$\frac{\alpha(\vec{x}_2)}{k} - \frac{\alpha(\vec{x}_1)}{k} = \frac{\alpha'(\vec{x}_2)}{k'} - \frac{\alpha'(\vec{x}_1)}{k'}$$

Furthermore, the proportionality constants of the two phase comparators may be selected so that they coincide.

Based on the above, it follows that the signal Q2 provides a quantity proportional to the difference:

$$\frac{\Delta P}{k} - \frac{\Delta R}{k'} \propto \left(\frac{l_1}{k} - \frac{l_0}{k'}\right)(\theta_2-\theta_1)$$

Such a quantity is, as desired, independent of the positional inclination and of the disturbances due to the propagation.

Once the value of Q2 (i.e., $\Delta P/k - \Delta R/k'$) has been measured, being $\theta_1$, $\theta_2$, k, k' and the value of $I_0$ (topological charge of the reference beam, which may be set initially) known, the topology charge value $I_1$ of the main beam is easily obtained from the aforesaid formula, and therefore also the orbital angular momentum $L_1$ of the main beam, keeping in mind that:

$$L=(I^*h)/2\pi.$$

If the main beam is phase-modulated, the equations at points R1, R2, P1, P2 become:

in R1: $E(\vec{x}_1,t)=B_1 e^{i\omega't} e^{il_0\theta_1} e^{i\varphi(\vec{x}_1)} e^{i\alpha(\vec{x}_1)}$ in R2: $E(\vec{x}_2,t)=B_2 e^{i\omega't} e^{il_0\theta_2} e^{i\varphi(\vec{x}_2)} e^{i\alpha(\vec{x}_2)}$ in P1: $E(\vec{x}_1,t)=A_1 e^{i\omega t+i\delta(t)} e^{il_1\theta_1} e^{i\varphi(\vec{x}_1)} e^{i\alpha(\vec{x}_1)}$ in P1: $E(\vec{x}_1,t)=A_1 e^{i\omega t+i\delta(t)} e^{il_1\theta_1} e^{i\varphi(\vec{x}_1)} e^{i\alpha(\vec{x}_1)}$ where δ (t) is the time-varying phase term due to the phase modulation equally detected on the first and second detectors. Since the phase term δ (t) compensates at the output of the second phase comparator 2, the following is also obtained:

$$\frac{\Delta P}{k} - \frac{\Delta R}{k'} \propto \left(\frac{l_1}{k} - \frac{l_0}{k'}\right)(\theta_2-\theta_1)$$

If the main beam is frequency-modulated, the equations at points R1, R2, P1, P2 become:

in R1: $E(\vec{x}_1,t)=B_1 e^{i\omega't} e^{il_0\theta_1} e^{i\varphi(\vec{x}_1)} e^{i\alpha(\vec{x}_1)}$ in R2: $E(\vec{x}_2,t)=B_2 e^{i\omega't} e^{il_0\theta_2} e^{i\varphi(\vec{x}_2)} e^{i\alpha(\vec{x}_2)}$ in P1: $E(\vec{x}_1,t)=A_1 e^{i[\omega t+k_f\int_0^t m(\tau)d\tau]} e^{il_1\theta_1} e^{i\varphi(\vec{x}_1)} e^{i\alpha(\vec{x}_1)}$ in P2: $E(\vec{x}_2,t)=A_2 e^{i[\omega t+k_f\int_0^t m(\tau)d\tau]} e^{il_1\theta_0} e^{i\varphi(\vec{x}_2)} e^{i\alpha(\vec{x}_2)}$ where m (τ) is the modulating signal over time and $k_f$ is a constant. Since the term $k_f\int_0^t m(\tau)d\tau$ compensates at the output of the second phase comparator, the following will still be obtained:

$$\frac{\Delta P}{k} - \frac{\Delta R}{k'} \propto \left(\frac{l_1}{k} - \frac{l_0}{k'}\right)(\theta_2-\theta_1)$$

A method is now described, also included in the invention, for performing a telecommunication of signals modulated according to any known modulation technique and grouped by means of orbital angular momentum variable multiplexing.

Such a method comprises the steps of generating a first electromagnetic radiation beam F1 characterized by a first orbital angular momentum $L_1$, and generating at least one second electromagnetic radiation beam F2 characterized by at least one respective second orbital angular momentum $L_2$. Both the first electromagnetic radiation beam F1 and the at least one second electromagnetic radiation beam F2 have respective spectra in the same first frequency band, and furthermore have respective radii of curvature substantially coinciding with a first beam radius-of-curvature value.

The method then involves modulating a first piece of information to be transmitted, represented by a first modulation function a(t), on the first electromagnetic radiation beam F1, by means of any modulation technique, to obtain a first modulated beam Fm1; furthermore, modulating at least one second piece of information to be transmitted, represented by a second modulation function b(t), on the at least one second electromagnetic radiation beam F2, by means of any modulation technique, to obtain a second modulated beam Fm2; then, generating a reference electromagnetic radiation beam F0, characterized by a second orbital angular momentum $L_0$, a second spectrum in a second frequency band which is distinct from the aforesaid first frequency band, and a second beam radius of curvature having a value substantially coinciding with the aforesaid first beam radius-of-curvature value.

The method then comprises the step of superimposing and/or combining the aforesaid reference beam F0, first modulated beam Fm1 and second modulated beam Fm2 to generate a composite electromagnetic radiation beam Q1, consisting of the superposition of the reference beam F0 and a main beam, in turn consisting of the superposition of the aforesaid first modulated beam Fm1 and at least one second modulated beam Fm2.

The method then comprises the step of transmitting the generated composite electromagnetic radiation beam Q1.

The method then includes receiving the aforesaid composite electromagnetic radiation beam, by means of a first beam detector 1 located in a first position, to generate a first composite beam electrical signal D1, representative of the electric and/or magnetic field and/or of the intensity of the electromagnetic radiation of the composite beam in the aforesaid first position; and receiving the aforesaid composite electromagnetic radiation beam, by means of a second beam detector 2 located in a second different position with respect to the first position, to generate a second composite beam electrical signal D2, representative of the electric and/or magnetic field and/or of the intensity of the received electromagnetic radiation of the composite beam in said second position.

The method further comprises the steps of performing a frequency discrimination of the first composite beam electrical signal D1 to obtain a first main beam electrical signal P1, representative of the electric and/or magnetic field and/or of the intensity due to the main beam in the first position, and a first reference beam electrical signal R1, representative of the electric and/or magnetic field and/or of the intensity due to the reference beam in the first position; and performing a frequency discrimination of the second composite beam electrical signal D2 to obtain a second main beam electrical signal P2, representative of the electric and/or magnetic field and/or of the intensity due to the main beam in the second position, and a second reference beam electrical signal R2, representative of the electric and/or magnetic field and/or of the intensity due to the reference beam in the second position.

The method further involves determining the phase of the first main beam electrical signal P1 and the phase of the second main beam electrical signal P2; furthermore, determining the phase of the first reference beam electrical signal R1 and the phase of the second reference beam electrical signal R2; then, determining a first phase difference value $\Delta P_{ab}$ corresponding to the difference between the phase of the first main beam electrical signal P1 and the phase of the second main beam electrical signal P2, in which such a first phase difference value $\Delta P_{ab}$ is dependent on the values taken by the first modulation function a(t) and the second modulation function b(t); furthermore, determining a second phase difference value $\Delta R$ corresponding to the difference between the phase of the first reference beam electrical signal R1 and the phase of the second reference beam electrical signal R2.

The method then comprises the steps of subtracting the second phase difference value $\Delta R$, divided by a second wave number k', from the first phase difference value $\Delta P_{ab}$, divided by a first wave number k, to obtain a difference value ($Q2 = \Delta P_{ab}/k - \Delta R/k'$). The first wave number k is the wave number corresponding to the main beam, defined as $k = 2\pi/\lambda$, $\lambda$ being the wavelength of the aforesaid main beam belonging to the aforesaid first frequency band. The second wave number k' is the wave number corresponding to the reference beam, defined as $k' = 2\pi/\lambda'$, $\lambda'$ being the wavelength of the aforesaid reference beam belonging to the aforesaid second frequency band.

The aforesaid difference value Q2 is representative of a combination of values taken by the first modulation function a(t) and the second modulation function b(t), while it is independent of positional inclination conditions between the first detector 1 and the second detector 2 and independent of phase variations due to disturbances suffered by the transmitted composite beam before reception.

The method finally involves demultiplexing and demodulating the information modulated on each of the first modulated beam Fm1 and the at least one second modulated beam Fm2, based on the aforesaid determined difference value ($Q2 = \Delta P_{ab}/k - \Delta R/k'$).

In accordance with an embodiment of such a method, the number of modulated beams which are orbital angular momentum-multiplexed is greater than two.

In accordance with an embodiment of such a method, the first electromagnetic radiation beam F1 and the at least one second electromagnetic radiation beam F2 are digitally amplitude-modulated, in accordance with the amplitudes of the first modulation function a(t) and the at least one second modulation function b(t).

In this case, the difference value ($Q2 = \Delta P_{ab}/k - \Delta R/k$) may take a plurality of expected values, each representative of a respective combination of digital amplitude values taken by the first modulation function a(t) and the at least one second modulation function b(t).

In accordance with an implementation option, the first electromagnetic radiation beam F1 and the at least one second electromagnetic radiation beam F2 are digitally amplitude-modulated, in a binary manner, and the amplitudes of the first modulation function a(t) and the at least one second modulation function b(t) may take the logical values 0 or 1.

In this case, the method comprises the further step of detecting the received power or intensity Q3 (by means of a detector 16) corresponding to the first main beam electrical signal P1 or the second main beam electrical signal P2, and comparing the power or intensity received with a minimum threshold.

The determined difference ($Q2 = \Delta P_{ab}/k - \Delta R/k'$) may take a first expected value ($\Delta P_{10}/k - \Delta R/k$) which is dependent on the first angular momentum ($L_1$), or a second expected value ($\Delta P_{01}/k - \Delta R/k$) which is dependent on the second angular momentum ($L_2$), or a third expected value ($\Delta P_{11}/k - \Delta R/k'$) which is dependent on a combination of the first and second angular momentums.

The step of demodulating, demultiplexing and demodulating the modulated information comprises: recognizing that the first modulated beam Fm1 carries information corresponding to 1 and the second modulated beam Fm2 carries information corresponding to 0 if the determined difference ($\Delta P_{ab}/k - \Delta R/k'$) takes the aforesaid first expected value ($\Delta P_{10}/k - \Delta R/k'$); recognizing that the first modulated beam Fm1 carries information corresponding to 0 and the second modulated beam Fm2 carries information corresponding to 1 if the determined difference ($\Delta P_{ab}/k - \Delta R/k'$) takes the aforesaid second expected value ($\Delta P_{01}/k - \Delta R/k'$); recognizing that the first modulated beam Fm1 carries information corresponding to 1 and the second modulated beam Fm2 carries information corresponding to 1 if the determined difference ($\Delta P_{ab}/k - \Delta R/k'$) takes the aforesaid third expected value ($\Delta P_{11}/k - \Delta R/k'$); recognizing that the first modulated beam Fm1 carries information corresponding to 0 and the second modulated beam Fm2 carries information corresponding to 0 if the received power or intensity Q3 is lower than the aforesaid minimum threshold.

In accordance with another embodiment of such a method, the first electromagnetic radiation beam F1 and the at least one second electromagnetic radiation beam F2 are digitally modulated based on the angular momentum. In this case, the angular momentum of the first beam F1 may take two different discrete values based on a first modulation function a(t) and the angular momentum of the at least one second beam F2 may take two different discrete values based on a respective at least one second modulation function b(t).

The difference value ($Q2=\Delta P_{ab}/k-\Delta R/k$) may take a plurality of expected values, each representative of a respective combination of digital amplitude values taken by the first modulation function a(t) and the at least one second modulation function b(t).

In accordance with an implementation option, the amplitudes of the first modulation function a(t) and the at least one second modulation function b(t) may take the logical values 0 or 1.

The determined difference ($\Delta P_{ab}/k-\Delta R/k$) may take: a first expected value ($\Delta P_{10}/k-\Delta R/k'$) when the first modulation function a(t) takes a value 1 and the second modulation function takes a value 0; or a second expected value ($\Delta P_{01}/k-\Delta R/k'$) when the first modulation function a(t) takes a value 0 and the second modulation function takes a value 1; or a third expected value ($\Delta P_{ab}/k-\Delta R/k'$) when the first modulation function a(t) takes a value 1 and the second modulation function takes a value 1; or a fourth expected value ($\Delta P_{00}/k-\Delta R/k$) when the first modulation function a(t) takes a value 0 and the second modulation function takes a value 0.

In this case, the step of demodulating, demultiplexing and demodulating the modulated information comprises: recognizing that the first modulated beam Fm1 carries information corresponding to 1 and the second modulated beam Fm2 carries information corresponding to 0 if the determined difference ($\Delta P_{ab}/k-\Delta R/k'$) takes the first expected value ($\Delta P_{10}/k-\Delta R/k'$); recognizing that the first modulated beam Fm1 carries information corresponding to 0 and the second modulated beam Fm2 carries information corresponding to 1 if the determined difference ($\Delta P_{ab}/k-\Delta R/k'$) takes the second expected value ($\Delta P_{01}/k-\Delta R/k'$); recognizing that the first modulated beam Fm1 carries information corresponding to 1 and the second modulated beam Fm2 carries information corresponding to 1 if the determined difference ($\Delta P_{ab}/k-\Delta R/k'$) takes the third expected value ($\Delta P_{11}/k-\Delta R/k'$); recognizing that the first modulated beam Fm1 carries information corresponding to 0 and the second modulated beam Fm2 carries information corresponding to 0 if the determined difference ($\Delta P_{ab}/k-\Delta R/k$) takes the fourth expected value ($\Delta P_{00}/k-\Delta R/k'$).

In accordance with an embodiment of such a method, the transmitted and received electromagnetic beams, mentioned above, are optical beams and/or laser beams.

In the following, a detailed implementation example of the telecommunication method described above is given, with the relevant physical-mathematical analysis.

In the following description, and in FIGS. 3 to 5, the points in which the different signals are present (first composite beam electrical signal D1, second composite beam electrical signal D2, first main beam electrical signal P1, first reference beam electrical signal R1, second main beam electrical signal P2f, second reference beam electrical signal R2) are indicated, for simplicity, with the same name as the respective signal.

Figure 3:
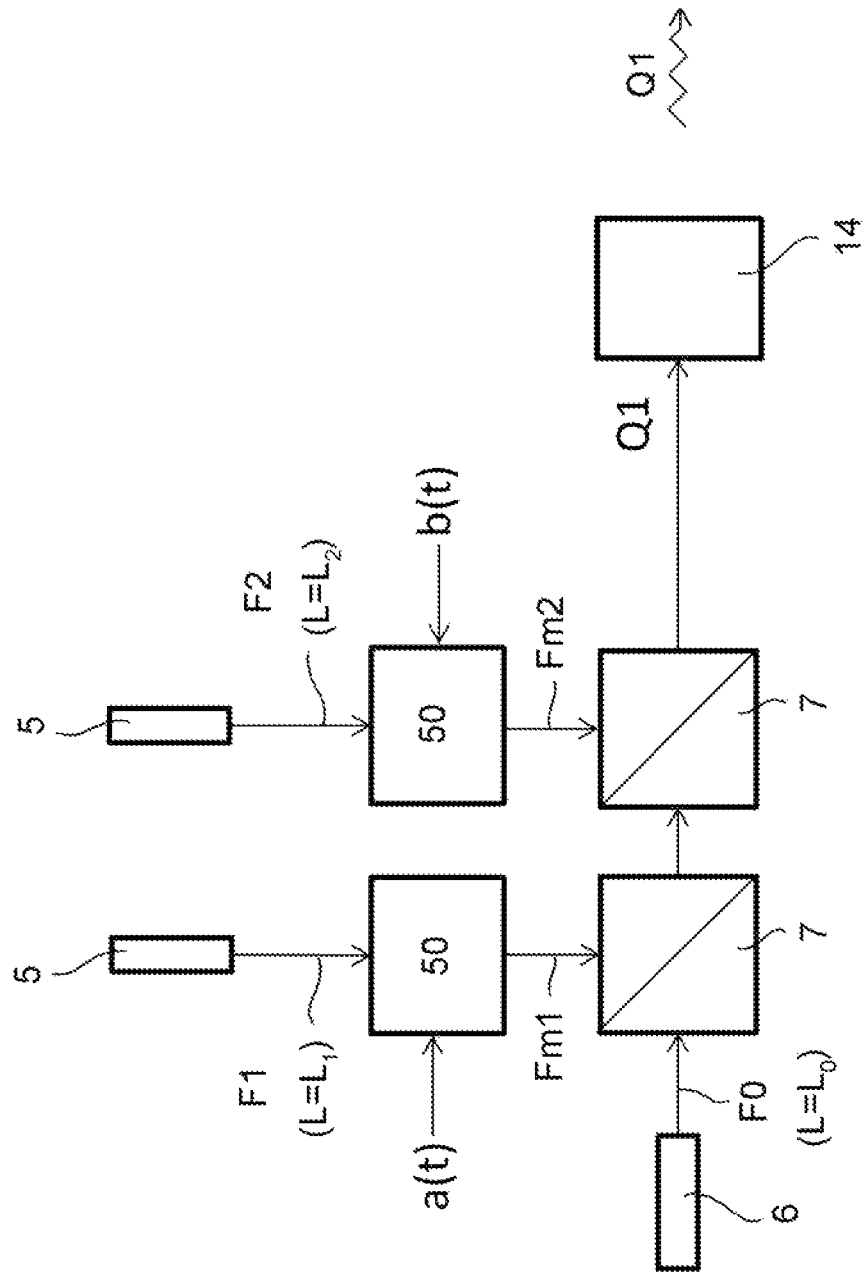
FIG. 3 shows a simplified diagram of a transmitting portion of an embodiment of the telecommunication system in accordance with the invention; such a FIG. 3 simultaneously shows some steps of the corresponding method.

A first beam with angular momentum $L_1$ (here defined as first main beam F1) and a second beam with angular momentum $L_2$ (here defined as second main beam F2) are superimposed on the reference beam with angular momentum $L_0$, as shown in FIG. 3. The two main beams have coinciding and/or overlapping frequency bands and are (in the example detailed herein) digitally amplitude-modulated. Furthermore, the two main beams have a substantially coinciding curvature.

The electric field, at the electrical signal D1, may be described by the following analytical formula:

$$E(\vec{x}_1, t) = A_1(t)e^{i\omega t}e^{il_1\theta_1}e^{i\varphi(\vec{x}_1)}e^{i\alpha(\vec{x}_1)} + C_1(t)e^{i\omega t}e^{il_2\theta_1}e^{i\varphi''(\vec{x}_1)}e^{i\alpha''(\vec{x}_1)} + B_1e^{i\omega' t}e^{il_0\theta_1}e^{i\varphi'(\vec{x}_1)}e^{i\alpha'(\vec{x}_1)}$$

where t is time, $A_1(t)$ and $C_1(t)$ are the amplitudes of the main beams varying over time, $B_1$ is the non-zero arbitrary amplitude of the reference beam, $l_1$ is the topological charge of the first main beam, $l_2$ is the topological charge of the second main beam, $l_0$ is the topological charge of the reference beam, $\theta_1$ is the angular position of the first detector measured on the plane orthogonal to the composite beam propagation vector containing the first detector 1, $\varphi(\vec{x}_1)$, $\varphi'(\vec{x}_1)$ and $\varphi''(\vec{x}_1)$ are arbitrary phases due to the positional inclination, while $\alpha\varphi(\vec{x}_1)$, $a'\varphi(\vec{x}_1)$ and $a''\varphi(\vec{x}_1)$ are arbitrary phases due to disturbances of the propagating wavefront.

The electric field, at the electrical signal D2, may be described by the following analytical formula:

$$E(\vec{x}_2, t) = A_2(t)e^{i\omega t}e^{il_1\theta_2}e^{i\varphi(\vec{x}_2)}e^{i\alpha(\vec{x}_2)} + C_2(t)e^{i\omega t}e^{il_2\theta_2}e^{i\varphi''(\vec{x}_2)}e^{i\alpha''(\vec{x}_2)} + B_2e^{i\omega' t}e^{il_0\theta_2}e^{i\varphi'(\vec{x}_2)}e^{i\alpha'(\vec{x}_2)}$$

where t is time, $A_2(t)$ and $C_2(t)$ are the amplitudes of the main beams varying over time, $B_2$ is the non-zero arbitrary amplitude of the reference beam, $l_1$ is the topological charge of the first main beam, $l_2$ is the topological charge of the second main beam, $l_0$ is the topological charge of the reference beam, $\theta_2$ is the angular position of the second detector measured on the plane orthogonal to the composite beam propagation vector containing the second detector 2, $\varphi(\vec{x}_2)$, $\varphi'(\vec{x}_2)$ and $\varphi''(\vec{x}_2)$ are arbitrary phases due to the positional inclination, while $\alpha(\vec{x}_2)$, $\alpha'(\vec{x}_2)$ and $\alpha''(\vec{x}_2)$ are arbitrary phases due to disturbances of the propagating wavefront.

As already observed above, the signals D1 and D2 are measured by means of two detectors, the reference beam is discriminated in frequency from the main beams, and the signals in R1, R2, P1, P2 are thus obtained using the following formulae:

in R1: $E(\vec{x}_1,t)=B_1e^{i\omega' t}e^{il_0\theta_1}e^{i\varphi(\vec{x}_1)}e^{i\alpha(\vec{x}_1)}$ in R2: $E(\vec{x}_2,t)=B_2e^{i\omega' t}e^{il_0\theta_2}e^{i\varphi(\vec{x}_2)}e^{i\alpha(\vec{x}_2)}$ in P1: $E(\vec{x}_1,t)=A_1e^{i\omega+i\delta(t)}e^{il_1\theta_1}e^{i\varphi(\vec{x}_1)}e^{i\alpha(\vec{x}_1)}+C_1(t)e^{i\omega' t}e^{il_2\theta_1}e^{i\varphi''(\vec{x}_1)}e^{i\alpha''(\vec{x}_2)}$ in P1: $E(\vec{x}_1,t)=A_1e^{i\omega+i\delta(t)}e^{il_1\theta_1}e^{i\varphi(\vec{x}_1)}e^{i\alpha(\vec{x}_1)}+C_2(t)e^{i\omega' t}e^{il_2\theta_2}e^{i\varphi''(\vec{x}_1)}e^{i\alpha''(\vec{x}_2)}$ In R1 and R2 there is only the reference beam, in P1 and P2 there are the superposed main beams.

The second phase comparator 4 provides a quantity proportional to the phase difference:

$\Delta R \propto l_0(\theta_2-\theta_1)+\varphi'(\vec{x}_2)-\varphi'(\vec{x}_1)+\alpha'(\vec{x}_2)-\alpha'(\vec{x}_1)$ In a digital modulation, the amplitudes may be written as $A_1=A_{1max}$ a(t), $A_2=A_{2max}$ a(t), $C_1=C_{1max}$ b(t), $C_2=C_{2max}$ b(t), where the functions a(t) and b(t) take values 0 or 1 depending on the information digitally modulated in the first and second modulators, respectively.

$A_{1max}$, $C_{1max}$ are the maximum amplitudes of the fields or of the signals representative of the main beams (first and second, respectively) received by the first detector; $A_{2max}$, $C_{2max}$ are the maximum amplitudes of the fields or of the signals representative of the main beams (first and second, respectively) received by the second detector. In the transmitter, it is possible to set the amplitudes of the main beams so that they are equal, i.e.:

$$A_{1max}=C_{1max}, A_{2max}=C_{2max}.$$

The first phase comparator 3 provides a quantity proportional to the phase difference between the fields or the signals in P1 and P2 which depends on the digital coding of the modulating functions a(t), b(t).

All possible combinations will now be considered.

When a(t)=0 and b(t)=0, the amplitudes of the main beams cancel each other out, and therefore the phase difference is indeterminable.

When a(t)=1 and b(t)=0, only the first main beam with angular momentum $L_1$ is there, and therefore a similar relationship to that already described above in the case of a single main beam applies:

$$\Delta P_{10} \propto l_1(\theta_2-\theta_1)+\varphi(\vec{x}_2)-\varphi(\vec{x}_1)+\alpha(\vec{x}_2)-\alpha(\vec{x}_1)$$

When a(t)=0 and b(t)=1, only the second main beam with angular momentum $L_2$ is there, and therefore a similar relationship to that already described above in the case of a single main beam applies:

$$\Delta P_{01} \propto l_2(\theta_2-\theta_1)+\varphi''(\vec{x}_2)-\varphi''(\vec{x}_1)+\alpha''(\vec{x}_2)-\alpha''(\vec{x}_1).$$

When a(t)=1 and b(t)=1, both the main beams are there, and therefore the following relationship holds:

$$\Delta P_{11} \propto \frac{1}{4}[(l_2+l_1)(\theta_2-\theta_1)+\varphi(\vec{x}_2)-\alpha(\vec{x}_1)+\varphi''(\vec{x}_2)-\varphi''(\vec{x}_1)+\alpha''(\vec{x}_2)-\alpha''(\vec{x}_1)].$$

Based on the above relationships, it is possible to calculate all the possible combinations of the modulating signals, so as to eliminate the arbitrariness of phase due to the positional inclinations and the wavefront distortions related to the propagation, similarly to what has already been described in the case of a single main beam.

In conclusion, the following relationships are therefore obtained.

When a(t)=0 and b(t)=0, the amplitudes of the main beams cancel each other out, and therefore the phase difference is indeterminable.

When a(t)=1 and b(t)=0, the following is obtained:

$$\frac{\Delta P_{10}}{k} - \frac{\Delta R}{k'} \propto \left(\frac{l_1}{k}-\frac{l_0}{k'}\right)(\theta_2-\theta_1)$$

When a(t)=0 and b(t)=1, the following is obtained:

$$\frac{\Delta P_{01}}{k} - \frac{\Delta R}{k'} \propto \left(\frac{l_2}{k}-\frac{l_0}{k'}\right)(\theta_2-\theta_1)$$

When a(t)=1 and b(t)=1, taking into account that also the main beams have a substantially coinciding curvature, the following is obtained:

$$\frac{\Delta P_{11}}{k} - \frac{\Delta R}{k'} \propto \left[\frac{1}{2}\left(\frac{l_2}{k}+\frac{l_1}{k}\right)-\frac{l_0}{k'}\right](\theta_2-\theta_1)$$

The aforesaid quantities ($\Delta P_{10}/k-\Delta R/k'$), ($\Delta P_{01}/k-\Delta R/k'$), ($\Delta P_{11}/k-\Delta R/k'$) may be easily made distinguishable, i.e., set at three different predefined known values, simply by suitably selecting the topological charges $I_0$, $I_1$, $I_2$ (i.e., the respective orbital angular momentums) of the reference beam and of the two main beams. Therefore such quantities, measured upon reception, are recognizable and indicative of the modulation values 0 or 1 applied to each of the two main beams. The information encoded thereon may therefore be decoded, i.e., demodulated and recognized.

Furthermore, advantageously, such quantities are made independent of the phase differences due to the positional inclinations and independent of the distortions of the propagating wavefront, which may be canceled by virtue of the presence of the reference beam (as already noticed above).

A possible example of a selection of values of the topological charges is:

$$I_0=0, I_1=0, I_2=2.$$

Other combinations are obviously detectable.

There is still to be recognized the status a(t)=0, b(t)=0, the phase of which is undetermined (as shown above). This status is easily identified since this is the only combination in which the amplitude of the fields or of the signals received for both the main beams is canceled. Therefore, the status a(t)=0, b(t)=0 is deterministically identified when the intensity or power of the signal detected at the point Q3 (by means of a detector 16 shown in FIG. 4) is below a predetermined threshold. Alternatively, both the first composite beam electrical signal D1 and the second composite beam electrical signal D2 may be monitored, in order to recognize the situation in which both signals are below a respective predefined threshold.

In the following, a detailed implementation example of the telecommunication method described above is given, based on orbital angular momentum modulation, with the relevant physical-mathematical analysis.

Angular momentum modulation may be described using arguments similar to those already developed for the digital amplitude modulation case.

The modulating functions a(t), b(t) take values 0 or 1 depending on the information digitally modulated in the first and second modulators, respectively. Such modulating functions determine a discrete variation of the angular momentum of the first electromagnetic radiation beam and of the at least one second electromagnetic radiation beam, respectively, depending on the binary value taken, i.e., $L_1$ and $L_2$ are functions dependent on the values taken by a(t) and b(t):

$$L_1=L_1(a(t)), L_2=L_2(b(t))$$

i.e., referring equivalently to topological charges: $I_1=I_1(a(t))$, $I_2=I_2(b(t))$.

As a result, the signals present in R1, R2, P1, P2 may be expressed as:

in R1: $E(\vec{x}_1,t)=B_1 e^{i\omega't}e^{il_0\theta_1}e^{i\varphi'(\vec{x}_1)}e^{i\alpha'(\vec{x}_1)}$ in R2: $E(\vec{x}_2,t)=B_2 e^{i\omega't}e^{il_0\theta_2}e^{i\varphi'(\vec{x}_2)}e^{i\alpha'(\vec{x}_2)}$ in P1: $E(\vec{x}_1,t)=A_1 e^{i\omega t}e^{il_1(a(t))\theta_1}e^{i\varphi(\vec{x}_1)}e^{i\alpha(\vec{x}_1)}+C_1 e^{i\omega t}e^{il_2(b(t))\theta_1}e^{i\varphi''(\vec{x}_1)}e^{i\alpha''(\vec{x}_1)}$ in P1: $E(\vec{x}_2,t)=A_2 e^{i\omega t}e^{il_1(a(t))\theta_2}e^{i\varphi(\vec{x}_2)}$
$e^{i\alpha(\vec{x}_2)}+C_2(t)e^{i\omega t}e^{il_2(b(t))\theta_2}e^{i\varphi''(\vec{x}_1)}e^{i\alpha''(\vec{x}_2)}$ In R1 and R2 there is only the reference beam; in P1 and P2 there are the superposed main beams.

The second phase comparator 4 provides a quantity proportional to the phase difference (as in the general case):

$$\Delta R \propto l_0(\theta_2-\theta_1)+\varphi'(\vec{x}_2)-\varphi'(\vec{x}_1)+\alpha'(\vec{x}_2)-\alpha'(\vec{x}_1)$$

The first phase comparator 3 provides a quantity proportional to the phase difference between the fields or the signals in P1 and P2 which depends on the digital coding of the modulating functions a(t), b(t).

Considering all the possible combinations the following is obtained:

$$\Delta P_{ab} \propto \tfrac{1}{4}[l_2(b(t))+l_1(a(t))(\theta_2-\theta_1)+\varphi(\vec{x}_2)-\varphi(\vec{x}_1)+\alpha$$
$$(\vec{x}_2)-\alpha(\vec{x}_2)+\varphi''((\vec{x}_2)-\varphi''(\vec{x}_2)+\alpha''(\vec{x}_2)-\alpha''(\vec{x}_2)].$$

where the combinations are determined by the indices a, b and by the corresponding values taken by the functions a(t), b(t).

The difference $\Delta P_{ab}/k - \Delta R/k'$ is then calculated for all the possible combinations of the modulating signals, so as to eliminate the arbitrariness of phase due to the positional inclinations and the wavefront distortions related to the propagation, by means of the formula:

$$\frac{\Delta P_{ab}}{k} - \frac{\Delta R}{k'} \propto \left[\frac{1}{2}\left(\frac{l_2(b(t))}{k}+\frac{l_1(a(t))}{k}\right)-\frac{l_0}{k'}\right](\theta_2-\theta_1)$$

The topological charge values $I_0$, $I_1(0)$, $I_1(1)$, $I_2(0)$, $I_2(1)$, or the respective corresponding orbital angular momentums, may be selected so that the corresponding quantities ($\Delta P_{00}/k-\Delta R/k'$), ($\Delta P_{01}/k-\Delta R/k'$), ($\Delta P_{10}/k-\Delta R/k'$), ($\Delta P_{11}/k-\Delta R/k'$), are different from each other and therefore recognizable, allowing to decode (demodulate) the coded (modulated) information.

Furthermore, the aforesaid quantities are independent of the phase differences due to the positional inclinations and distortions of the propagating wavefront, which may be eliminated by virtue of the presence of the reference beam.

An example of topological charge value choice is $I_0=0$, $I_1(0)=0$, $I_1(1)=1$, $I_2(0)=0$, $I_2(1)=2$ from which it follows that:

$$\left(\frac{\Delta P_{00}}{k}-\frac{\Delta R}{k'}\right)=0$$

$$\left(\frac{\Delta P_{10}}{k}-\frac{\Delta R}{k'}\right)=\frac{1}{2k}(\theta_2-\theta_1)$$

$$\left(\frac{\Delta P_{01}}{k}-\frac{\Delta R}{k'}\right)=\frac{1}{k}(\theta_2-\theta_1)$$

$$\left(\frac{\Delta P_{11}}{k}-\frac{\Delta R}{k'}\right)=\frac{3}{2k}(\theta_2-\theta_1)$$

As it may be seen, the four aforesaid quantities are different, and therefore can be recognized.

Similarly to the above reported example, other value allocations are obviously possible.

Figure 4:
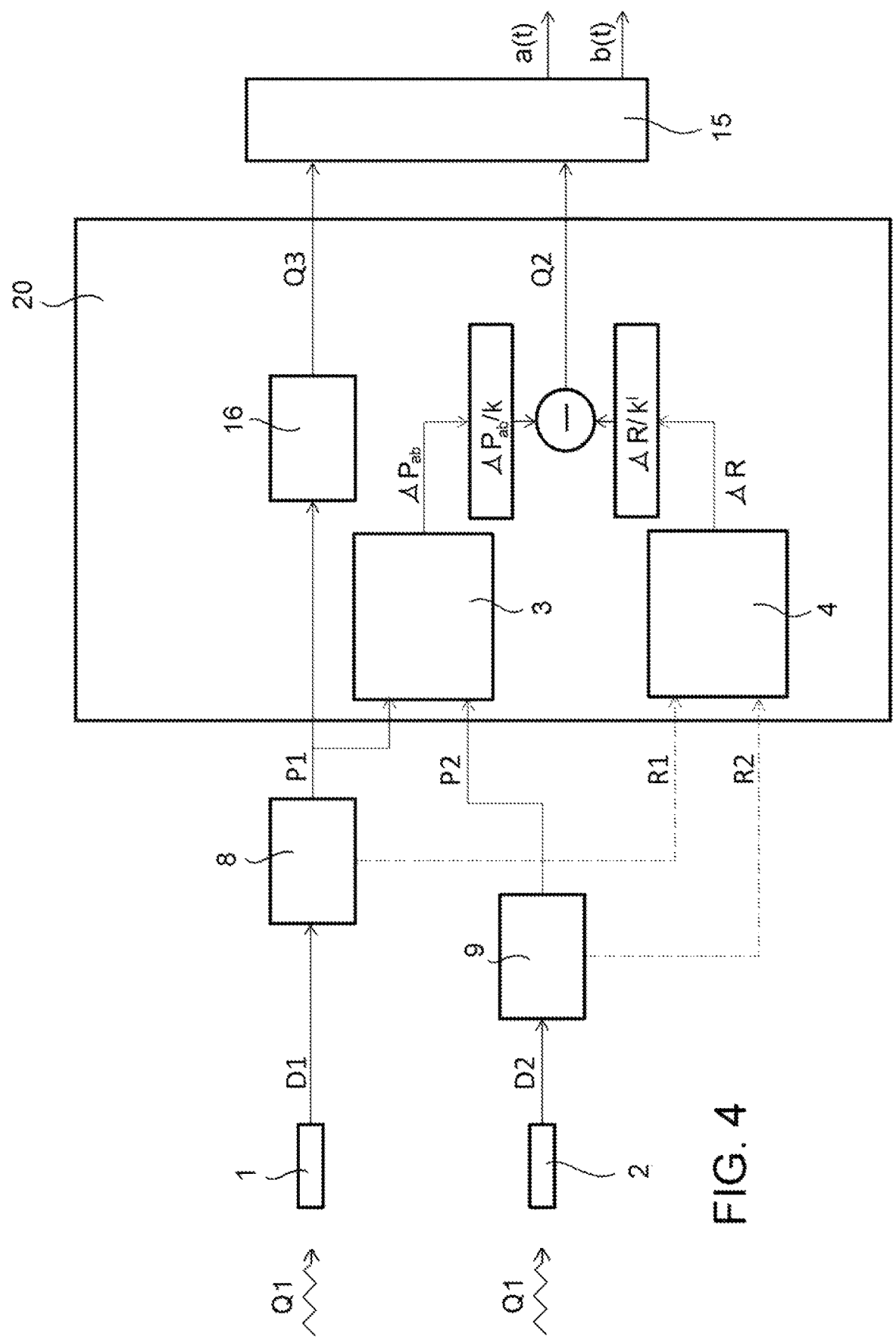
FIG. 4 shows a simplified diagram of a receiving portion of an embodiment of the telecommunication system in accordance with the invention; such a FIG. 4 simultaneously shows some other steps of the corresponding method.

It should be noted that angular momentum modulation is similar, in many respects, to amplitude modulation, and that the block diagrams shown in FIGS. 3 and 4 also apply to angular momentum modulation, with the only obvious difference that modulators modulate the angular momentum and not the amplitude. Furthermore, the threshold detector of FIGS. 4 and 5 is not necessary in this case.

Figure 2:
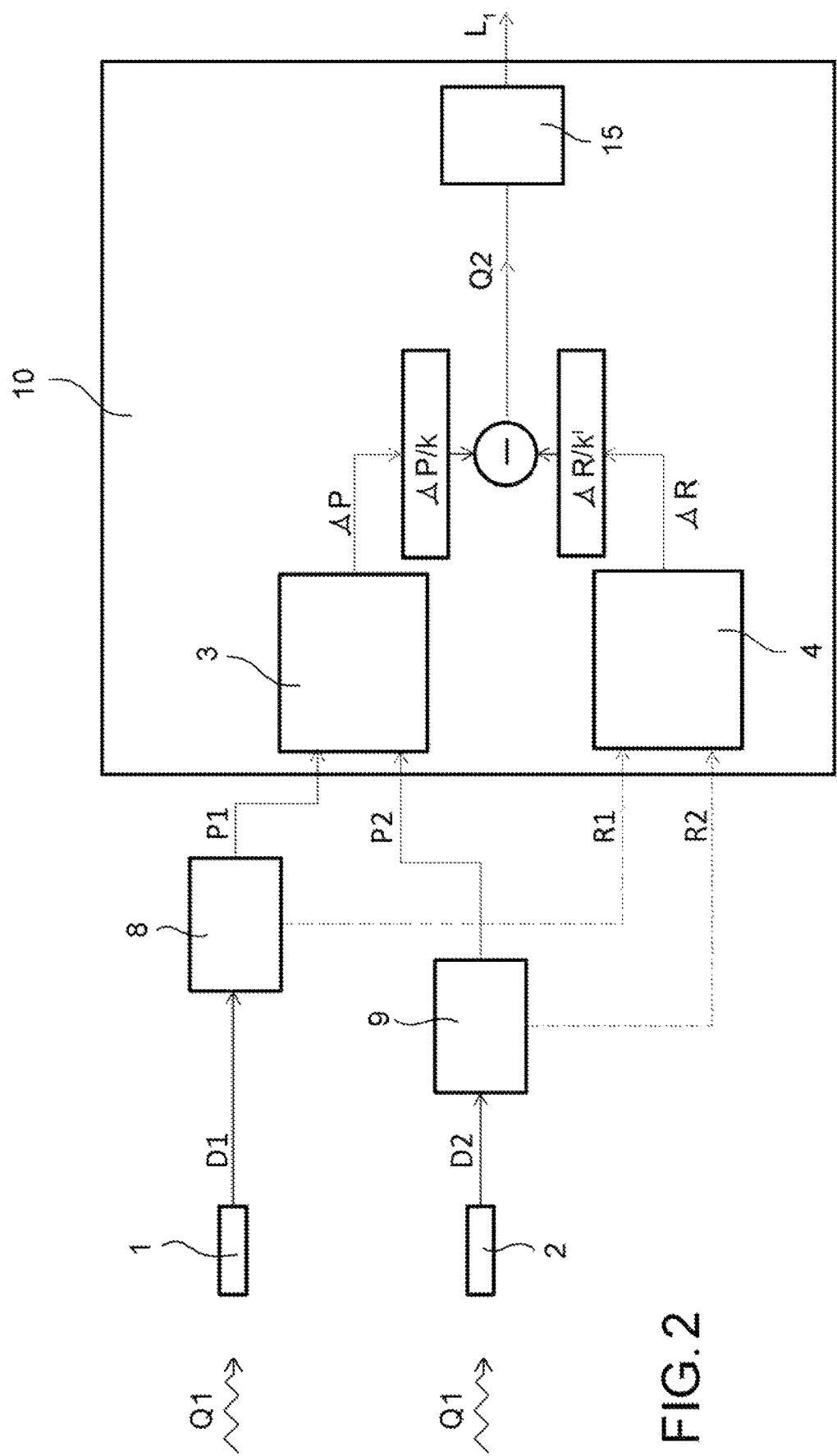
FIG. 2 shows a simplified diagram of a receiving portion of an embodiment of the system for transmitting and receiving an electromagnetic radiation beam, in accordance with the invention; such a FIG. 2 simultaneously shows some other steps of the corresponding method.

With reference to FIGS. 1 and 2, a system for transmitting and receiving an electromagnetic radiation beam is now described, adapted to determine an orbital angular momentum of the received electromagnetic radiation beam.

Such a system comprises means 5 for generating a main electromagnetic radiation beam F1, means 6 for generating a reference electromagnetic radiation beam F0, means for generating 7 and transmitting 14 a composite electromagnetic radiation beam Q1 (shown in FIG. 1), means for receiving the composite electromagnetic radiation beam, first beam detection means 1, second beam detection means 2, first frequency discrimination means 8, second frequency discrimination means 9, and means 10 for determining the orbital angular momentum (shown in FIG. 2).

The means 5 for generating a main electromagnetic radiation beam are configured to generate a main electromagnetic radiation beam F1 characterized by a first orbital angular momentum $L_1$, a first spectrum in a first frequency band, and a first beam radius of curvature.

The means 6 for generating a reference electromagnetic radiation beam are configured to generate a reference electromagnetic radiation beam F0, characterized by a second orbital angular momentum $L_0$, a second spectrum in a second frequency band which is distinct from said first frequency band, and a second beam radius of curvature substantially coinciding with said first beam radius of curvature.

The means for generating 7 and transmitting 14 a composite electromagnetic radiation beam are configured to generate a composite electromagnetic radiation beam Q1, consisting of the superposition of the aforesaid main beam F1 and reference beam F0, and for transmitting such a generated composite electromagnetic radiation beam Q1.

The means for receiving the composite electromagnetic radiation beam comprise first beam detection means 1, located in a first position, configured to generate a first composite beam electrical signal D1, representative of the electric and/or magnetic field and/or of the intensity of the electromagnetic radiation of the composite beam in the first position; and second beam detection means 2, located in a second position, which are different with respect to the aforesaid first position, configured to generate a second composite beam electrical signal D2, representative of the electric and/or magnetic field and/or of the intensity of the electromagnetic radiation of the composite beam in the second position.

The first frequency discrimination means 8 are configured to perform a frequency discrimination of the first composite beam electrical signal D1 to obtain a first main beam electrical signal P1, representative of the electric and/or magnetic field and/or of the intensity due to the main beam in the first position, and a first reference beam electrical signal R1, representative of the electric and/or magnetic field and/or of the intensity due to the reference beam in the first position.

The second frequency discrimination means 9 are configured to perform a frequency discrimination of the second composite beam electrical signal to obtain a second main beam electrical signal P2, representative of the electric and/or magnetic field and/or of the intensity due to the main beam in the second position, and a second reference beam electrical signal R2, representative of the electric and/or magnetic field and/or of the intensity due to the reference beam in the second position.

The means 10 for determining the orbital angular momentum are configured to determine the orbital angular momentum $L_1$ of the main electromagnetic radiation beam and/or the spatial phase variation of the main electromagnetic radiation beam due to the main beam orbital angular momentum $L_1$, based on the aforesaid main beam first electrical signal P1, second main beam electrical signal P2, first reference beam electrical signal R1 and second reference beam electrical signal R2.

In accordance with different implementation options, the system is configured to perform a method for transmitting and receiving an electromagnetic radiation beam according to any of the embodiments described above.

In accordance with an embodiment of the system, the means 5 for generating a main electromagnetic radiation beam and the means 6 for generating a reference electromagnetic radiation beam comprise one or more sources or transmitters of electromagnetic beams which are known per se (for example, in an implementation option, a laser).

In accordance with an implementation option, the means 5 for generating a main electromagnetic radiation beam further comprise an amplitude and/or frequency and/or phase modulator 50 and/or one or more angular momentum modulators 50 (such angular momentum modulators 50 may be, for example, spatial light modulators).

In accordance with an embodiment of the system, the means 7 for generating a composite electromagnetic radiation beam comprise an electromagnetic beam combiner with two or more inputs and an output, which are known per se (for example, a beam combiner).

In accordance with an embodiment of the system, the first beam detection means 1 comprise one or more diaphragms (optical openings), or an antenna or a group of antennas or any other electromagnetic beam receiver, which are known per se, adapted to operate at the frequencies of the first and second beam. The means for transmitting an electromagnetic beam 14 comprise for example one or more transmission antennas.

In accordance with an embodiment of the system, the second beam detection means 2 comprise one or more diaphragm (optical openings), or an antenna or a group of antennas or any other electromagnetic beam receiver, which are known per se, adapted to operate at the frequencies of the first and second beam.

In accordance with different implementations, the first frequency discrimination means 8 and the second frequency discrimination means 9 may comprise frequency filters, which are known per se.

In accordance with an embodiment of the system, the means 10 for determining the orbital angular momentum comprise at least two phase comparators 3, 4 and at least one processor 15, configured to derive the orbital angular momentum by means of processing (according, for example, to the formulae previously shown), based on the output signals from the phase comparators.

In accordance with an embodiment of the system, the means 10 for determining the orbital angular momentum comprise at least two correlators 11, 12 and at least one processor 15, configured to derive the orbital angular momentum by means of processing (according, for example, to the formulae previously shown), based on the output signals from the correlators.

Figure 5:
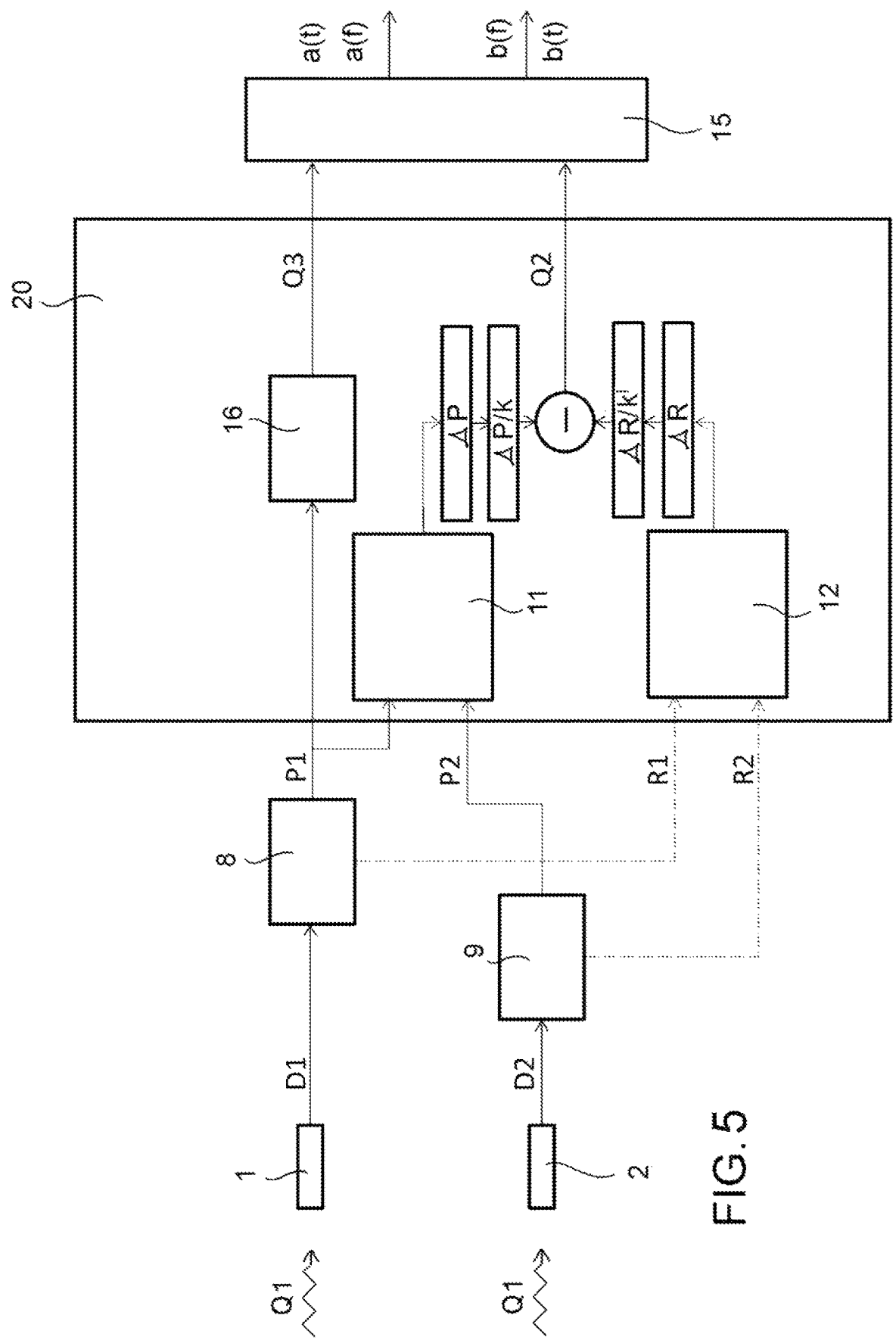
FIG. 5 shows an embodiment of the systems in accordance with the invention, comprising correlators.

Further details are provided herein, with reference to FIG. 5, with regard to the implementation option which involves the use of a correlator.

In this case, instead of using a phase comparator which provides a value proportional to the phase difference $\Delta P$ or $\Delta R$, a correlator is used which provides a value proportional to the cosine of the phase difference $\cos(\Delta P)$ or $\cos(\Delta R)$. The phase difference is then determined by the inverse function:

$\Delta P = \arccos[\cos(\Delta P)]$ $\Delta R = \arccos[\cos(\Delta R)]$

The correlation may be determined by means of the direct product of the fields or signals representative at P1 and P2 or at R1 and R2.

Alternatively, the correlation may be determined by means of interference, by measuring the average intensity $\langle I \rangle$ of the interference between the fields at P1 and P2, having intensity $I_{P1}$ and $I_{P2}$, respectively, or at R1 and R2, having intensity $I_{R1}$ and $I_{R2}$, respectively, knowing that:

$\cos(\Delta P) = \langle I \rangle - I_{P1} - I_{P2})/(2(I_{P1}I_{P2})^{1/2})$ $\cos(\Delta R) = \langle I \rangle - I_{R1} - I_{R2})/(2(I_{R1}I_{R2})^{1/2})$ In accordance with an embodiment of the aforesaid system, the transmitted and received electromagnetic beams mentioned above are optical beams and/or laser beams.

With reference to FIGS. 3 and 4, a system for performing a telecommunication of modulated signals according to any known modulation technique and grouped by means of multiplexing in the orbital angular momentum variable is now described.

Such a system comprises means 5, 6 for generating an electromagnetic beam, modulation means 50, beam combination and/or superposition means 7, transmission means 14, beam reception means 1, 2, 8, 9, phase determination means 20 and processing means 15.

The means 5, 6 for generating an electromagnetic beam are configured to generate a first electromagnetic radiation beam F1 characterized by a first orbital angular momentum $L_1$, and to generate at least one second electromagnetic radiation beam F2 characterized by at least one respective second orbital angular momentum $L_2$.

Both the first electromagnetic radiation beam F1 and the at least one second electromagnetic radiation beam F2 have respective spectra in the same first frequency band, and furthermore have respective radii of curvature substantially coinciding with a first beam radius-of-curvature value.

The means 5, 6 for generating an electromagnetic beam are further configured to generate a reference electromagnetic radiation beam F0, characterized by a second orbital angular momentum $L_0$, a second spectrum in a second frequency band which is distinct from the aforesaid first frequency band, and a second beam radius of curvature having a value substantially coinciding with the aforesaid first beam radius-of-curvature value.

The modulation means 50 are configured to modulate a first piece of information to be transmitted, represented by a first modulation function a(t), on the first electromagnetic radiation beam F1, by means of any amplitude and/or phase and/or frequency modulation technique, to obtain a first modulated beam Fm1; modulate at least one second piece of information to be transmitted, represented by a second modulation function b(t), on the at least one second electromagnetic radiation beam F2, by means of any amplitude and/or phase and/or frequency modulation technique, to obtain a second modulated beam Fm2.

The beam combination and/or superposition means 7 are configured to superimpose and/or combine the aforesaid reference beam F0, first modulated beam Fm1 and second modulated beam Fm2 to generate a composite electromagnetic radiation beam Q1, consisting of the superposition of the reference beam and a main beam, in turn consisting of the superposition of the aforesaid first modulated beam Fm1 and at least one second modulated beam Fm2.

The transmission means 14 are configured to transmit the aforesaid generated composite electromagnetic radiation beam.

The means for receiving the composite electromagnetic radiation beam comprise first beam detection means 1, second beam detection means 2, first frequency discrimination means 8, second frequency discrimination means 9.

The first beam detection means 1 are located in a first position, and are configured to generate a first composite beam electrical signal D1, representative of the electric and/or magnetic field and/or of the intensity of the electromagnetic radiation of the composite beam in the first position.

The second beam detection means 2 are located in a second position, which is different with respect to the first position and are configured to generate a second composite beam electrical signal D2, representative of the electric and/or magnetic field and/or of the intensity of the electromagnetic radiation of the composite beam in the second position.

The first frequency discrimination means 8 are configured to perform a frequency discrimination of the first composite beam electrical signal D1 to obtain a first main beam electrical signal P1, representative of the electric and/or magnetic field and/or of the intensity due to the main beam in the first position, and a first reference beam electrical signal R1, representative of the electric and/or magnetic field and/or of the intensity due to the reference beam in the first position.

The second frequency discrimination means 9 are configured to perform a frequency discrimination of the second composite beam electrical signal to obtain a second main beam electrical signal P2, representative of the electric and/or magnetic field and/or of the intensity due to the main beam in the second position, and a second reference beam electrical signal R2, representative of the electric and/or magnetic field and/or of the intensity due to the reference beam in the second position.

The phase determination means 20 are configured to determine the phase of the first main beam electrical signal P1 and the phase of the second main beam electrical signal P2, and also to determine the phase of the first reference beam electrical signal R1 and the phase of the second reference beam electrical signal R2.

The phase determination means 20 are further configured to determine a first phase difference value $\Delta P_{ab}$ corresponding to the difference between the phase of the first main beam electrical signal P1 and the phase of the second main beam electrical signal P2, in which such a first phase difference value $\Delta P_{ab}$ is dependent on the values taken by the first modulation function a(t) and the second modulation function b(t); and, furthermore, determining a second phase difference value $\Delta R$ corresponding to the difference between the phase of the first reference beam electrical signal R1 and the phase of the second reference beam electrical signal R2; and, furthermore, subtracting the second phase difference value $\Delta R$, divided by a wave number k', from the first phase difference value $\Delta P_{ab}$, divided by a wave number k, to obtain a difference value $Q2=\Delta P_{ab}/k-\Delta R/k'$. The first wave number k is the wave number corresponding to the main beam, defined as $k=2\pi/\lambda$, $\lambda$ being the wavelength of the aforesaid main beam belonging to the aforesaid first frequency band. The second wave number k' is the wave number corresponding to the reference beam, defined as $k'=2\pi/\lambda'$, $\lambda'$ being the wavelength of the aforesaid reference beam belonging to the aforesaid second frequency band.

The aforesaid difference value $Q2=\Delta P_{ab}/k-\Delta R/k'$ is representative of a combination of values taken by the first modulation function a(t) and the second modulation function b(t), while it is independent of positional inclination conditions between the first detector 1 and the second detector 2 and independent of phase variations due to disturbances suffered by the transmitted composite beam before reception.

The processing means 15 are configured to demultiplex and demodulate the modulated information on each of the first modulated beam Fm1 and the at least one second modulated beam Fm2, based on the aforesaid determined difference value $Q2=\Delta P_{ab}/k-\Delta R/k'$.

In accordance with different implementations, the system is configured to perform an electromagnetic radiation beam telecommunication method according to any of the embodiments described above.

In accordance with an embodiment of the system, the means 5, 6 for generating an electromagnetic beam comprise one or more sources or transmitters of electromagnetic beams which are known per se (for example, in an implementation option, a laser).

In accordance with an embodiment of the system, the modulation means 50 comprise amplitude and/or frequency and/or phase and/or angular momentum modulators which are known per se.

In accordance with an embodiment of the system, the first and second beam detection means 1, 2 comprise one or more diaphragm (optical openings), or an antenna or a group of antennas or any other electromagnetic beam receiver, which are known per se, adapted to operate at the frequencies of the first and second beam, respectively.

In accordance with an embodiment of the system, the first and second frequency discrimination means 8, 9 comprise frequency filters, which are known per se.

In accordance with an embodiment of the system, the phase determination means 20 comprise at least two phase comparators 3, 4, which are known per se.

In accordance with an embodiment of the system, the first and second frequency discrimination means comprise correlators 11, 12, which are known per se. With regard to such correlators, the same considerations, illustrated above with reference to the system for transmitting and receiving electromagnetic beams, apply.

In accordance with an embodiment of the system, the processing means 15 comprise one or more processors, which are known per se, and the related software.

In accordance with an embodiment of the aforesaid system, the transmitted and received electromagnetic beams mentioned above are optical beams and/or laser beams.

Figure 7:
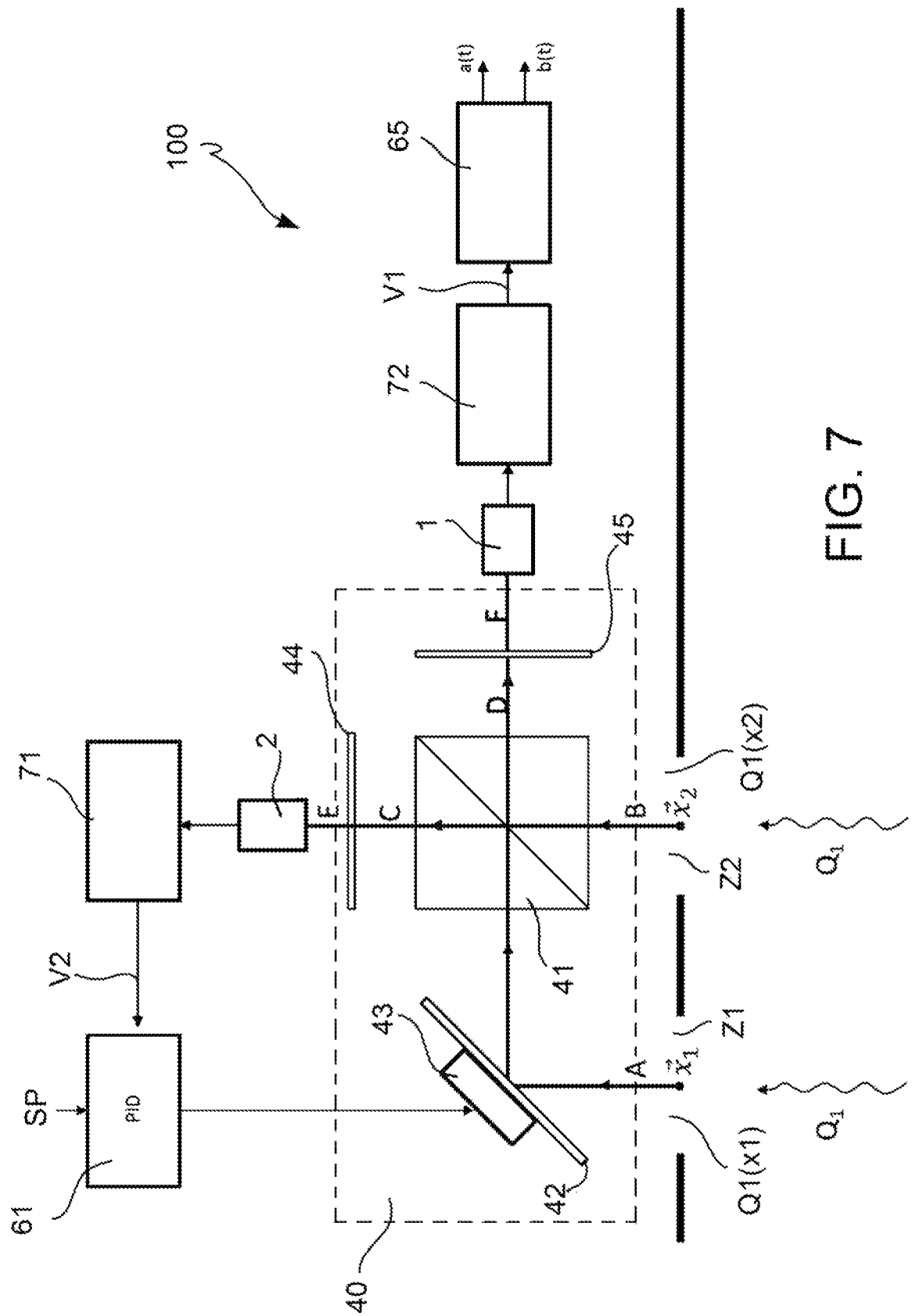
FIG. 7 depicts a system for demultiplexing and demodulating signals, in accordance with an embodiment of the invention.
Figure 8:
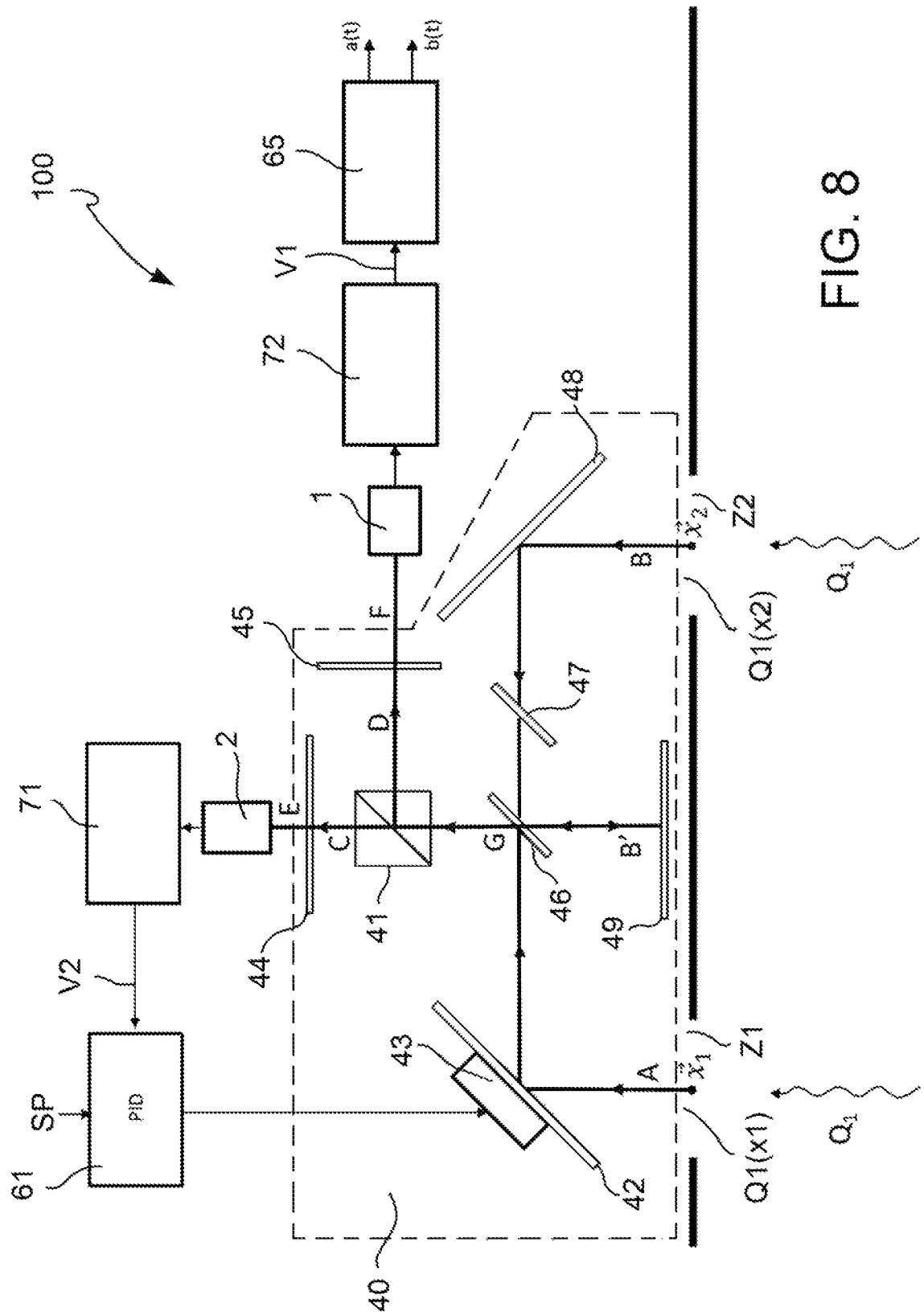
FIGS. 8 and 9 depict a system for demultiplexing and demodulating signals, in accordance with two respective further embodiments of the invention.
Figure 9:
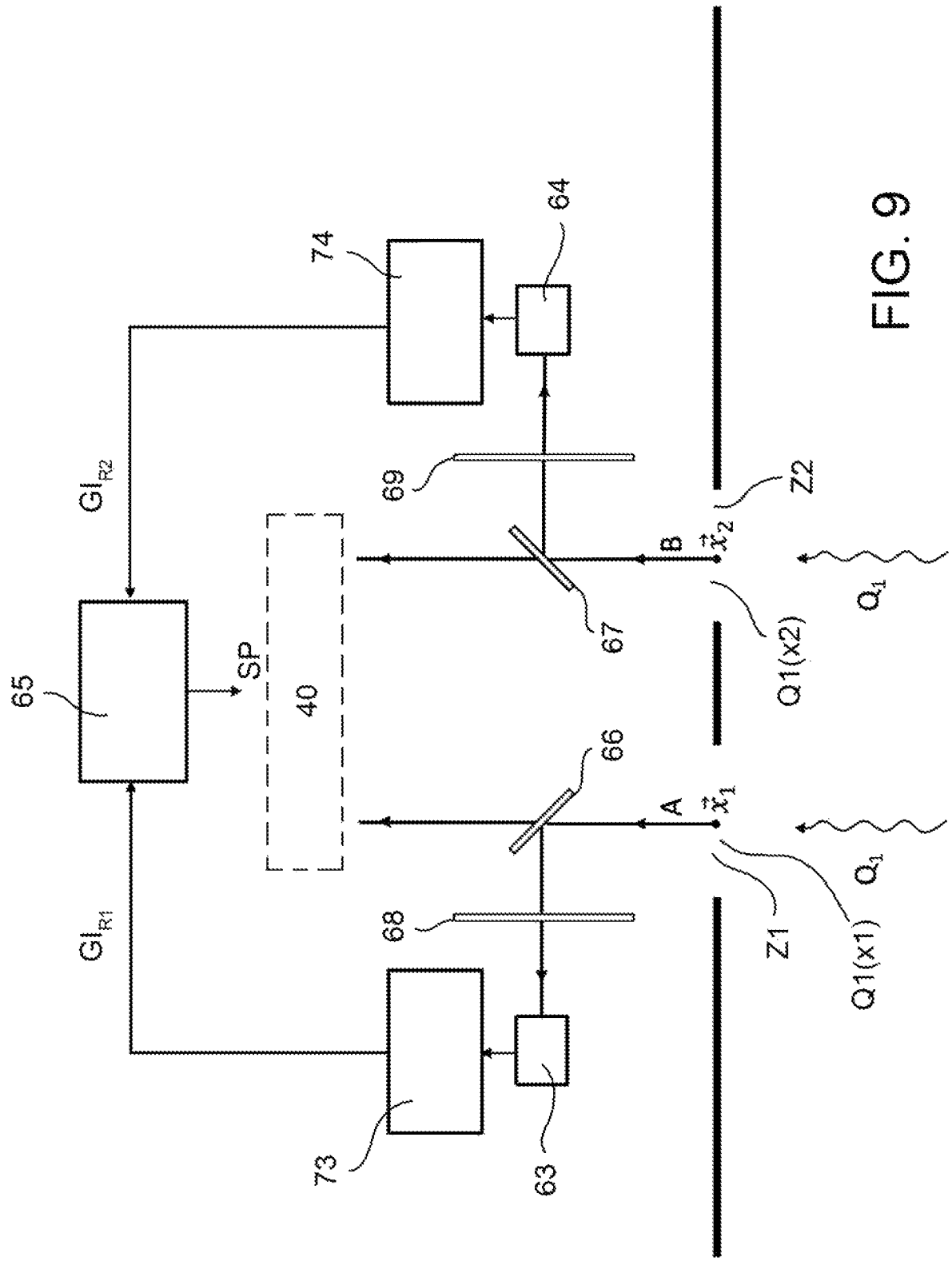

With reference to FIGS. 7-9, a method for demultiplexing and demodulating amplitude-modulated signals grouped by means of multiplexing in the orbital angular momentum variable will be described below.

The method applies to the case in which the signal to be demultiplexed and demodulated comprises a composite electromagnetic radiation beam Q1, consisting of the superposition of a reference beam F0 and a main beam, in turn consisting of the superposition of a first modulated beam Fm1 and at least one second modulated beam Fm2.

The first modulated beam Fm1 is obtained by modulating a first piece of information, represented by a first modulation function a(t), on a first electromagnetic radiation beam F1, by means of any amplitude modulation technique.

The aforesaid at least one second modulated beam Fm2 is obtained by modulating at least one second piece of information, represented by a second modulation function b(t), on at least one respective second electromagnetic radiation beam (F2), by means of any amplitude modulation technique.

The aforesaid first electromagnetic radiation beam F1 is characterized by a first orbital angular momentum $L_1$; the aforesaid at least one second electromagnetic radiation beam F2 is characterized by a respective at least one second orbital angular momentum $L_2$, in which both the first electromagnetic radiation beam F1 and the at least one second electromagnetic radiation beam F2 have a respective spectrum in the same first frequency band, and furthermore have respective radii of curvature substantially coinciding with a first beam radius-of-curvature value.

The aforesaid reference electromagnetic radiation beam F0 is characterized by a second orbital angular momentum $L_0$, a second spectrum in a second frequency band which is distinct from the first frequency band, and a second beam radius of curvature having a value substantially coinciding with the first beam radius-of-curvature value.

The method, first of all, comprises the step of passing the aforesaid composite electromagnetic radiation beam Q1 through two openings Z1, Z2, so as to obtain, downstream of the first opening Z1, a first composite beam portion Q1(x1), and, downstream of the second opening Z2, a second composite beam portion Q1(x2).

The method further involves transmitting the first composite beam portion Q1(x1) along a first branch A of an interferometer 40, and the second composite beam portion Q1(x2) along a second branch B of the interferometer 40.

The method then involves superimposing, by means of a beam splitter 41 of the interferometer, the first composite beam portion Q1(x1) and the second composite beam portion Q1(x2) along a third branch D of the interferometer, to obtain a respective third electromagnetic beam D, and along a fourth branch of the interferometer C, to obtain a respective fourth electromagnetic beam C.

The method further comprises the steps of performing a frequency discrimination of the third electromagnetic beam D around the first frequency band, so as to obtain a third filtered electromagnetic beam F in which the contribution deriving from the reference beams of the first composite beam portion Q1(x1) and of the second composite beam portion Q1(x2) have been canceled, and in which the components deriving from the respective first modulated beam Fm1(x1), Fm1(x2) and at least one second modulated beam Fm2(x1), Fm2(x2) remain.

A frequency discrimination of the fourth electromagnetic beam C is then performed around the second frequency band of the reference beam, so as to obtain a fourth filtered electromagnetic beam E consisting of the superposition of the two reference beams F0(x1), F0(x2) belonging to the first composite beam portion Q1(x1) and the second composite beam portion Q1(x2), respectively.

The method further comprises detecting the third filtered electromagnetic beam F, by means of a first beam detector 1, to generate a first electrical signal V1, representative of the intensity of the electromagnetic radiation of the third filtered electromagnetic beam F; and determining, based on said first electrical signal V1, a first phase difference value $\Delta P_{ab}$ between the component of the third filtered electromagnetic beam deriving from the first composite beam filtered portion Fm1(x1), Fm2(x1) and the component of the third electromagnetic beam deriving from the second composite beam filtered portion Fm1(x2), Fm2(x2), at the first beam detector 1, in which the aforesaid first phase difference value $\Delta P_{ab}$ is dependent on the value taken by the first modulation function a(t) and the second modulation function b(t).

The method further involves detecting the aforesaid fourth filtered electromagnetic beam E, by means of a second beam detector 2, to generate a second electrical signal V2, representative of the intensity of the electromagnetic radiation of the fourth filtered electromagnetic beam E; and determining, based on the aforesaid second electrical signal V2, a second phase difference value $\Delta R$ between the two reference beams F0(x1), F0(x2) belonging to the first composite beam portion Q1(x1) and the second composite beam portion Q1(x2), at the second beam detector 2.

The method finally provides the step of demultiplexing and demodulating the information a(t), b(t) modulated on each of the first modulated beam Fm1 and the at least one second modulated beam Fm2, based on said first phase difference value $\Delta P_{ab}$ and second phase difference value $\Delta R$.

It should be noted that the demodulation and modulation performed in this method are, advantageously, "local" modulation and demultiplexing, in the sense that they are based on the detection of even only a limited, i.e., "local", portion of the electromagnetic beam, without requiring a detection of the entire wavefront of the beam.

In accordance with an embodiment of the method, the aforesaid step of demultiplexing and demodulating comprises subtracting the second phase difference value $\Delta R$, divided by a second wave number k', from the first phase difference value $\Delta P_{ab}$, divided by a first wave number k, to obtain a difference value $Q2 = \Delta P_{ab}/k - \Delta R/k'$, and then demultiplexing and demodulating the modulated information on each of the first modulated beam Fm1 and the at least one second modulated beam Fm2, based on such a determined difference value $Q2 = \Delta P_{ab}/k - \Delta R/k'$.

The first wave number k is the wave number corresponding to the main beam, defined as $k = 2\pi/\lambda$, $\lambda$ being the wavelength of the main beam, and the second wave number k' is the wave number corresponding to the reference beam, defined as $k' = 2\lambda/\lambda'$, $\lambda'$ being the wavelength of the reference beam.

The aforesaid difference value $Q2 = \Delta P_{ab}/k - \Delta R/k'$ is representative of a combination of values taken by the first modulation function a(t) and the second modulation function b(t), while it is independent of positional inclination conditions between the first detector and the second detector and independent of phase variations due to disturbances suffered by the transmitted composite beam before reception.

In accordance with an implementation option of the method, the first electromagnetic radiation beam F1 and the at least one second electromagnetic radiation beam F2 are digitally amplitude-modulated, in accordance with the amplitudes of the first modulation function a(t) and the at least one second modulation function b(t).

The difference value $Q2 = \Delta P_{ab}/k - \Delta R/k'$ may take a plurality of expected values, each representative of a respective combination of digital amplitude values taken by the first modulation function a(t) and the at least one second modulation function b(t).

According to an implementation option of the method, the first electromagnetic radiation beam F1 and the at least one second electromagnetic radiation beam F2 are digitally amplitude-modulated, in a binary manner, and the amplitudes of the first modulation function a(t) and the at least one second modulation function b(t) may take the logical values 0 or 1.

In this case, the method comprises the further step of detecting the received power or intensity of the third filtered electromagnetic beam F, corresponding to the first electrical signal V1 detected by the first beam detector 1, and comparing the received power or intensity with a minimum threshold.

The determined difference ($Q2=\Delta P_{ab}/k-\Delta R/k$) may take a first expected value ($\Delta P_{10}/k-\Delta R/k$) which is dependent on the first orbital angular momentum ($L_1$), or a second expected value ($\Delta P_{01}/k-\Delta R/k'$) which is dependent on the second orbital angular momentum ($L_2$), or a third expected value ($\Delta P_{11}/k-\Delta R/k$) which is dependent on a combination of the first and second angular momentums.

In this case, the step of demultiplexing and demodulating the modulated information comprises:

recognizing that the first modulated beam Fm1 carries information corresponding to 1 and the second modulated beam Fm2 carries information corresponding to 0 if the determined difference ($\Delta P_{ab}/k-\Delta R/k'$) takes the aforesaid first expected value ($\Delta P_{10}/k-\Delta R/k'$);

recognizing that the first modulated beam Fm1 carries information corresponding to 0 and the second modulated beam Fm2 carries information corresponding to 1 if the determined difference ($\Delta P_{ab}/k-\Delta R/k$) takes the aforesaid second expected value ($\Delta P_{01}/k-\Delta R/k'$);

recognizing that the first modulated beam Fm1 carries information corresponding to 1 and the second modulated beam Fm2 carries information corresponding to 1 if the determined difference ($\Delta P_{ab}/k-\Delta R/k'$) takes the aforesaid third expected value ($\Delta P_{11}/k-\Delta R/k'$);

recognizing that the first modulated beam Fm1 carries information corresponding to 0 and the second modulated beam Fm2 carries information corresponding to 0 if the received power or intensity of the third filtered electromagnetic beam F is lower than the aforesaid minimum threshold.

in accordance with another embodiment of the method, the first phase difference value $\Delta P_{ab}$ depends on the average intensity Im1 of the third filtered electromagnetic beam F, associated with the respective interference pattern, and the aforesaid first electrical signal V1 is representative of such an average intensity of the third filtered electromagnetic beam F which is detected by the first beam detector 1; the second phase difference value $\Delta R$ depends on the average intensity Im2 of the fourth filtered electromagnetic beam E, associated with the respective interference pattern, and the aforesaid second electrical signal V2 is representative of the average intensity Im2 of the fourth filtered electromagnetic beam E which is detected by the second beam detector 2.

In this case, the method further comprises the step of keeping the average intensity Im2 of the fourth filtered electromagnetic beam E constant, at a predefined intensity value, by means of a feedback control loop controlled by the second electrical signal V2 and acting on the first composite beam portion Q1(x1), so that the second phase difference value $\Delta R$, remains constant, being set at a predefined value.

In accordance with an implementation option, the first electromagnetic radiation beam F1 and the at least one second electromagnetic radiation beam F2 are digitally amplitude-modulated, in accordance with the amplitudes of the first modulation function a(t) and the at least one second modulation function b(t).

In this case, the first phase difference value=$\Delta P_{ab}$ may take a plurality of expected values, each representative of a respective combination of digital amplitude values taken by the first modulation function a(t) and the at least one second modulation function b(t).

According to an implementation option, the first electromagnetic radiation beam F1 and the at least one second electromagnetic radiation beam F2 are digitally amplitude-modulated (for example, by means of ON-OFF-KEYING—OOK—modulation, or other modulation manners which are known per se), in a binary manner, and the amplitudes of the first modulation function a(t) and the at least one second modulation function b(t) may take the logical values 0 or 1.

In this case, the method comprises the further step of detecting the received power or intensity of the third filtered electromagnetic beam F, corresponding to the first electrical signal V1 detected by the first beam detector 1, and comparing the received power or intensity with a minimum threshold.

The first phase difference value $\Delta P_{ab}$ determined may take a first expected value $\Delta P_{10}$ which is dependent on the first orbital angular momentum $L_1$, or a second expected value $\Delta P_{01}$ which is dependent on the second orbital angular momentum $L_2$, or a third expected value $\Delta P_{11}$ which is dependent on a combination of the first and second orbital angular momentums.

The step of demultiplexing and demodulating the modulated information comprises:

recognizing that the first modulated beam Fm1 carries information corresponding to 1 and the second modulated beam Fm2 carries information corresponding to 0 if the first phase difference value $\Delta P_{ab}$ determined takes the aforesaid first expected value $\Delta P_{10}$;

recognizing that the first modulated beam Fm1 carries information corresponding to 0 and the second modulated beam Fm2 carries information corresponding to 1 if the first phase difference value $\Delta P_{ab}$ determined takes the aforesaid second expected value $\Delta P_{10}$;

recognizing that the first modulated beam Fm1 carries information corresponding to 1 and the second modulated beam Fm2 carries information corresponding to 1 if the first phase difference value $\Delta P_{ab}$ determined takes the aforesaid third expected value $\Delta P_{11}$;

recognizing that the first modulated beam Fm1 carries information corresponding to 0 and the second modulated beam Fm2 carries information corresponding to 0 if the received power or intensity of the third filtered electromagnetic beam F is lower than said minimum threshold.

In accordance with an embodiment of the method, the number of modulated beams, which are orbital-angular-momentum-multiplexed, is equal to N, greater than two.

Each modulated beam is characterized by a respective orbital angular momentum $L_1$ and is amplitude-modulated by a respective modulating function, and each of the possible value combinations of the modulating functions on the N modulated beams corresponds to a respective value of first phase difference $\Delta P_{a1\ldots aN}$ and/or to a respective difference value ($Q2=\Delta P_{a1\ldots aNb}/k-\Delta R/k'$).

In accordance with an embodiment of the method, shown in FIG. 8, the method further comprises the steps of: arranging a first additional optical path (along the branches indicated in FIG. 8 as A and G) for the first composite beam portion Q1(x1), and arranging a second additional optical path (along the branches indicated in FIG. 8 as B, B' and G, in which B' is traversed twice) for the second composite beam portion Q1(x2), before the superposition of the first and of the second composite beam portion, in the interferometer.

The aforesaid first additional optical path and second additional optical path are predefined and sized so as to cancel the phase difference ($\varphi_{P2}-\varphi_{P1}$) which results between the phase of the second composite beam portion Q1(x2) and the phase of the first composite beam portion Q1(x1) due to the overall optical path difference between the respective inlet opening and the first beam detector 1, and so as to cancel the phase difference ($\varphi_{R2}-\varphi_{R1}$) which results between the phase of the second composite beam portion Q1($x$2) and the phase of the first composite beam portion Q1($x$1) due to the overall optical path difference between the respective inlet opening and the second beam detector 2.

According to another embodiment of the method, the step of keeping the average intensity Im2 of the fourth filtered electromagnetic beam E constant comprises controlling, by means of a control unit 61, which receives as an input the second electrical signal V2 and a setting signal SP, a first mirror 42 which is hit by the first composite beam portion Q1($x$1), to vary, in a controlled manner, the length of the optical path A traversed by the first composite beam portion (Q1($x$1)) and, consequently, to vary the phase shift of said first and second electromagnetic beam portion, Q1($x$1) and Q2($x$2), respectively, so as to modify the average intensity (Im2) detected by the second detector 2 in a controlled manner which is dependent on the second electrical signal V2 and on the setting signal SP, so as to keep the second phase difference value ΔR, and the average intensity Im2 of the fourth filtered electromagnetic beam E constant, set at respective predefined values which are dependent on the setting signal SP.

In accordance with an implementation option, the variation of the optical path A is obtained by translating the first mirror 42, in a controlled manner, by an actuator 43 controlled by the control unit 61 (which may be, for example, configured to perform a "PID control", Proportional-Integral-Derivative).

In accordance with a further embodiment of the method, shown in FIG. 9, the step of keeping the average intensity Im2 of the fourth filtered electromagnetic beam E constant comprises compensating variations of the intensity $I_{R1}$ of the reference beam associated with the first composite beam portion, at the second beam detector 2, and compensating variations of the intensity $I_{R2}$ of the reference beam associated with the second composite beam portion, at the second beam detector 2.

The aforesaid step of compensating comprises:
- deflecting a part of the beam corresponding to the first composite beam portion Q1($x$1) at the first branch A of the interferometer;
- detecting, by means of a third beam detector 63 the intensity of the deflected part of the beam corresponding to the first composite beam portion Q1($x$1), and generating a first compensation electrical signal $GI_{R1}$ representative of the intensity of the first beam portion;
- deflecting a part of the beam corresponding to the second composite beam portion Q1($x$2) at the second branch B of the interferometer;
- detecting, by means of a fourth beam detector 64 the intensity of the second beam portion, and generating a second compensation electrical signal $GI_{R2}$ representative of the intensity of the second beam portion;
- modifying the setting signal SP, by means of a processing unit 65, based on the first compensation electrical signal $GI_{R1}$ and the second compensation electrical signal $GI_{R2}$.

According to an implementation option of the method, all the aforesaid electromagnetic beams are optical beams and/or laser beams.

In accordance with an embodiment of the method, the orbital angular momentum of the reference beam is known at all times.

In accordance with a particular implementation option, the orbital angular momentum of the reference beam takes the constant value $L_0=0$.

In accordance with an embodiment of the method, the second frequency band is substantially monochromatic.

According to a particular implementation option, the second frequency band is adjacent to the first frequency band.

In accordance with an implementation option, the steps of performing a frequency discrimination of the first or of the second electrical signal of composite beam comprise performing a frequency filtering.

With reference to FIGS. 7-9, a system 100 for demultiplexing and demodulating amplitude-modulated signals grouped by multiplexing in the orbital angular momentum variable will be described below.

The type of signal to be demultiplexed and demodulated comprises a composite electromagnetic radiation beam Q1, consisting of the superposition of a reference beam F0 and a main beam, in turn consisting of the superposition of a first modulated beam Fm1 and at least one second modulated beam Fm2, according what has already been previously described with reference to the method in accordance with the invention.

The system 100 comprises a screen equipped with two openings Z1, Z2, configured to let the composite electromagnetic radiation beam Q1 pass through the aforesaid two openings Z1, Z2 so as to obtain, downstream of the first opening Z1, a first composite beam portion Q1($x$1) and, downstream of the second opening Z2, a second composite beam portion Q1($x$2).

The system 100 further comprises an interferometer 40 arranged downstream with respect to the two openings Z1, Z2, and comprising, in turn: a first interferometer branch A, configured to be traversed by the first composite beam portion Q1($x$1); a second interferometer branch B, configured to be traversed by the second composite beam portion Q1($x$2); a beam splitter 41, configured to superimpose the first composite beam portion Q1($x$1)) and the second composite beam portion Q1($x$2)) along a third branch D of the interferometer, to obtain a respective third electromagnetic beam D, and along a fourth branch of the interferometer C, to obtain a respective fourth electromagnetic beam C.

The interferometer 40 further comprises first frequency discrimination means 45 and second frequency discrimination means 44.

The first frequency discrimination means 45 are configured to discriminate in frequency the third electromagnetic beam D around the first frequency band, so as to obtain a third filtered electromagnetic beam F in which the contribution deriving from the reference beams of the first composite beam portion Q1($x$1) and of the second composite beam portion Q1($x$2) have been canceled, and in which the components deriving from the respective first modulated beam Fm1($x$1), Fm1($x$2) and at least one second modulated beam Fm2($x$1), Fm2($x$2) remain.

The second frequency discrimination means 44 are configured to discriminate in frequency the fourth electromagnetic beam C around the second frequency band of the reference beam, so as to obtain a fourth filtered electromagnetic beam E consisting of the superimposition of the two reference beams F0($x$1), F0($x$2) belonging to the first composite beam portion Q1($x$1) and the second composite beam portion Q1($x$2), respectively.

The system 100 further comprises a first beam detector 1, configured to detect the aforesaid third filtered electromagnetic beam F, to generate a first electrical signal V1, representative of the intensity of the electromagnetic radiation of the third filtered electromagnetic beam F.

The system 100 further comprises a second beam detector 2, configured to detect the aforesaid fourth filtered electromagnetic beam E, to generate a second electrical signal V2, representative of the intensity of the electromagnetic radiation of the fourth filtered electromagnetic beam E.

The system 100 finally comprises processing means 65, configured to:
- determine, based on the first electrical signal V1, a first phase difference value $\Delta P_{ab}$ between the component of the third filtered electromagnetic beam deriving from the first composite beam filtered portion Fm1($x$1), Fm2($x$1) and the component of the third electromagnetic beam deriving from the second composite beam filtered portion Fm1($x$2), Fm2($x$2), at the first beam detector 1; such a first phase difference value $\Delta P_{ab}$ is dependent on the values taken by the first modulation function a(t) and the second modulation function b(t);
- determine, based on the aforesaid second electrical signal V2, a second phase difference value $\Delta R$ between the two reference beams F0($x$1), F0($x$2) belonging to the first composite beam portion Q1($x$1) and the second composite beam portion Q1($x$2), at the second beam detector 2;
- demultiplex and demodulate the information a(t), b(t) modulated on each of the first modulated beam Fm1 and the at least one second modulated beam Fm2, based on the aforesaid first phase difference value $\Delta P_{ab}$ and second phase difference value $\Delta R$.

In accordance with an implementation option of the system, the first frequency discrimination means 45 comprise an optical bandpass filter, in which the passband corresponds to said first band frequency.

In accordance with an implementation option of the system, the second frequency discrimination means 44 comprise a narrow-band optical bandpass filter (laser-line), in which the passband corresponds to said second band frequency of the reference beam.

In accordance with an implementation option of the system, the first and the second beam detector 1, 2 comprise a first photodiode and a second photodiode, respectively.

In accordance with an implementation option of the system, the processing means 65 comprise one or more electronic processors 65.

According to an embodiment, the system 100 further comprises a control unit 61, adapted to receive as an input the second electrical signal V2 and a setting signal SP, and further comprise an actuator 43, controlled by the control unit 61, and a first mirror 42, controlled by the actuator 43, and arranged so that the first composite beam portion Q1($x$1) hits it.

The control unit 61 is configured to vary, in a controlled manner, the length of the optical path A traversed by the first composite beam portion Q1($x$1) and, consequently, to vary the phase shift of the aforesaid first Q1($x$1) and second Q2($x$2) electromagnetic beam portion, so as to modify the average intensity Im2 detected by the second detector 2 in a controlled manner which is dependent on the second electrical signal V2 and on the setting signal SP, so as to keep the second phase difference value $\Delta R$, and the average intensity Im2 of the fourth filtered electromagnetic beam E constant, set at respective predefined values which are dependent on the setting signal SP.

In accordance with an embodiment, the system 100 further comprises means for balancing the optical paths 46, 47, 48, 49, configured to arrange a first additional optical path (A, G) for the first composite beam portion Q1($x$1), and to arrange a second additional optical path (B, B', B', G) for the second composite beam portion Q1($x$2), before the superposition of the first and of the second composite beam portion, in the interferometer.

Such a step of arranging comprises arranging the first additional optical path (A, G) and second additional optical path (B, B', B', G) so as to cancel the phase difference ($\varphi_{P2}-\varphi_{P1}$) which results between the phase of the second composite beam portion Q1($x$2) and the phase of the first composite beam portion Q1($x$1) due to the overall optical path difference between the respective inlet opening and the first beam detector 1, and so as to cancel the phase difference ($\varphi_{R2}-\varphi_{R1}$) which results between the phase of the second composite beam portion Q1($x$2) and the phase of the first composite beam portion Q1($x$1) due to the overall optical path difference between the respective inlet opening and the second beam detector 2.

In accordance with an implementation option, the aforesaid means for balancing the optical paths comprise a second mirror 48, a compensating plate 47, a semi-reflective plate 46 and a third mirror 49 arranged along the path of the second composite beam portion Q1($x$2) along the second branch B of the interferometer, so as to form the aforesaid second additional optical path (B, B', B', G).

The aforesaid semi-reflective plate 46 is further arranged also along the path of the first composite beam portion Q1($x$2), and is configured to transmit the first composite beam portion Q1($x$1) and the second composite beam portion Q1($x$2) to the beam splitter 41.

In accordance with an embodiment, the system 100 further comprises beam intensity compensation means, configured to compensate variations of the intensity ($I_{R1}$) of the reference beam associated with the first composite beam portion, at the second beam detector 2, and variations of the intensity ($I_{R2}$) of the reference beam associated with the second composite beam portion, at the second beam detector 2.

The beam intensity compensation means comprise a first semi-reflective plate 66, a first narrow-band optical bandpass filter 68, a third beam detector 63, a second semi-reflective plate 67, a second optical bandpass filter 69, a fourth beam detector 64, a processing unit 65.

The first semi-reflective plate 66 is configured to deflect a part of the beam corresponding to the first composite beam portion Q1($x$1) at the first branch A of the interferometer.

The first narrow-band optical bandpass filter 68 is configured to filter the deflected part of the beam corresponding to the first composite beam portion Q1($x$1), around the second frequency band of the reference beam.

The third beam detector 63 is configured to detect the intensity of the deflected part of the beam corresponding to the first composite beam portion Q1($x$1), and generate a first compensation electrical signal $GI_{R1}$ representative of the intensity of the first beam portion.

The second semi-reflective plate 67 is configured to deflect a part of the beam corresponding to the second composite beam portion Q1($x$2) at the second branch B of the interferometer.

The second optical bandpass filter 69 is configured to filter the deflected part of the beam corresponding to the second composite beam portion Q1($x$2), around the second frequency band of the reference beam.

The fourth beam detector 64 is configured to detect the intensity of the deflected part of the beam corresponding to the second composite beam portion Q1($x$2), and generate a second compensation electrical signal $GI_{R2}$ representative of the intensity of the second beam portion.

The processing unit 65 is configured to modify the setting signal SP, based on the first compensation electrical signal $GI_{R1}$ and the second compensation electrical signal $GI_{R2}$.

In accordance with an implementation option of the system, the aforesaid electrical signals generated by the different beam detectors are suitably amplified, in a manner which is obvious and known per se, by respective electronic amplifiers (indicated in FIGS. 7-9 with reference numerals 71, 72, 73, 74).

In accordance with possible implementations, the aforesaid system 100 is configured to perform a method according to any of the embodiments of the method described above.

By way of non-limiting example, a detailed description of an embodiment of the method and of the system according to the present invention will be provided below, in which the interferometric technique and several variants thereof allow the communication of signals which are OOK (ON-OFF-KEYING) amplitude-modulated and orbital angular momentum-multiplexed using the composite beam.

In the example, optical beams are taken into consideration and the beam detectors are photodiodes.

As shown in FIG. 7, the composite beam Q1 generated, modulated and multiplexed as described above (see, for example, FIG. 3) enters through the two openings Z1 and Z2 into the two branches A and B of the interferometer.

The beam of the branch A is divided by the beam splitter 41 into two beams along the branches C and D.

The beam of the branch B is also divided by the beam splitter 41 into two beams along the branches C and D.

The beams which propagate along the branch C are filtered by a laser-line bandpass filter 44 capable of transmitting only the reference beam (frequency discrimination).

The center-band wavelength of the laser-line filter 44 must be equal to the wavelength of the laser used as reference beam in transmission.

In section E, on the plane containing the photodiode 2 and along the optical axis, the fields of the reference beam alone originating from the branches A and B may be represented, respectively, as $$E(\vec{x}_1, t)e^{i\varphi R1}$$

$$E(\vec{x}_2, t)e^{i\varphi R2}$$

where $\varphi_{R1}$ is a phase term due to the propagation of the radiation from $\vec{x}_1$ to the photodiode 2, $\varphi_{R2}$ is a phase term due to the propagation of the radiation from $\vec{x}_2$ to the photodiode 2.

It should be noted that the phase terms $e^{i\varphi R1}$, $e^{i\varphi R2}$, are due to the optical path in the two arms of the interferometer. In an unbalanced configuration, such as that in FIG. 7, there are no limitations as long as $\Delta L < c/\Delta u$, where $\Delta L$ is the difference in optical path of the interferometer arms while $\Delta u$ is the bandwidth of the information, c is the speed of light in a vacuum.

In case of limitations emerging from this point of view, for example, for high information bandwidths (GHz or tens of GHz) or when the distance between the two openings Z1 and Z2 is wide, the embodiment with a balanced interferometer may be used, which will be described below with reference to FIG. 8.

Anyway, the unbalanced interferometer remains of great interest due to the greater construction simplicity and may still be used practically when the relationship $\Delta L < c/\Delta u$ is well verified.

The fields $E(\vec{x}_1, t)$, $E(\vec{x}_2, t)$ are defined as:

$$E(\vec{x}_1, t) = B_1 e^{i\omega' t} e^{il0\theta_1} e^{i\varphi'(\vec{x}_1)} e^{i\alpha'(x_1)}$$

$$E(\vec{x}_2, t) = B_2 e^{i\omega' t} e^{il0\theta_2} e^{i\varphi'(\vec{x}_2)} e^{i\alpha'(x_2)}$$

where the various quantities have the meaning already described above.

The fields $E(\vec{x}_1, t)e^{i\varphi R1}$, $E(\vec{x}_2, t)e^{i\varphi R2}$ interfere with one another, producing an interference pattern, the average intensity Im2 of which (herein also defined with the symbol <I>), measured in the center of the interference pattern (along the optical axis) on the plane containing the photodiode 2, is in relation to the cosine of the phase difference $\Delta R$ of the fields themselves according to the following relationship [1]:

$$\cos(\Delta R) = \langle I \rangle - I_{R1} - I_{R2})/(2(I_{R1} I_{R2})^{1/2})$$

where $I_{R1}$ and $I_{R2}$ are the intensities of the fields $E(\vec{x}_1, t)e^{i\varphi R1}$, $E(\vec{x}_2, t)e^{i\varphi R2}$, respectively.

The intensity <I> of the interference pattern is converted into an electrical signal by the photodiode 2. The electrical signal is suitably amplified, conditioned and applied at the input of a control unit 61.

According to an implementation option, such a control unit 61 performs a control of the PID type (Proportional-Integral-Derivative), which is well known per se. The PID control acts on the actuator 43 of the first mirror 42, so that the intensity <I>, measured on the photodiode 2 and amplified, is substantially equal to the value of the setting signal SP.

In accordance with various possible implementation variants, the aforesaid actuator of the first mirror 43 is piezoelectric, or magnetic, or capacitive, or of another type known per se.

The intensity <I> is further kept mostly constant by the PID control as the positional tilt of the wavefront which illuminates the interferometer varies. The tilt may be caused by relative displacements between the wavefront and the interferometer, or by vibrations or perturbations of the propagating wavefront.

Since the intensities $I_{R1}$ and $I_{R2}$ are also substantially constant during the measurement, the quantity $\Delta R$ is also substantially constant, as shown in the relationship [1].

If the intensities $I_{R1}$ and $I_{R2}$ are not constant, the embodiment with compensated setting signal is used, which will be described below, with reference to FIG. 9.

It is interesting to note that this feedback solution for interferometers (also called "locked" interferometer) is here declined in a new and peculiar manner, since the "locking" of the interferometer is carried out by the reference beam of the composite beam (by means of frequency discrimination) while the main beams of the composite beam are discriminated in frequency along the other branch of the interferometer.

The beams along the branch D are filtered by a bandpass filter 45 capable of only transmitting the main beams.

The center-band wavelength of the bandpass filter 45 must be equal to the wavelength of the laser used to generate the main beams in transmission, while the filter band must be equal to or greater than the information band which is to be transferred.

In section F, on the plane containing the photodiode 1 and along the optical axis, the fields of the main beams originating from the branches A and B may be represented, respectively, as:

$$E(\vec{x}_1, t)e^{i\varphi_{P1}}$$

$$E(\vec{x}_2, t)e^{i\varphi_{P2}}$$

where $\varphi_{P1}$ is a phase term due to the propagation of the radiation from $\vec{x}_1$ to the photodiode 1, $\varphi_{P2}$ is a phase term due to the propagation of the radiation from $\vec{x}_2$ to the photodiode 1.

The fields $E(\vec{x}_1, t)$, $E(\vec{x}_1, t)$ are expressed by means of the equations:

$$E(\vec{x}_1,t) = \underline{A_1 e^{i\omega t} e^{i l_1 \theta_0} e^{i\varphi(\vec{x}_1)} e^{i\alpha(\vec{x}_1)}} + C_1(t) e^{i\omega t} e^{i l_2 \theta_1}$$
$$\underline{e^{i\varphi''(\vec{x}_1)} e^{i\alpha''(\vec{x}_2)}}$$

$$E(\vec{x}_2,t) = \underline{A_2 e^{i\omega t} e^{i l_1 \theta_2} e^{i\varphi(\vec{x}_2)} e^{i\alpha(\vec{x}_2)}} + C_2(t) e^{i\omega t} e^{i l_2 \theta_2}$$
$$\underline{e^{i\varphi''(\vec{x}_2)} e^{i\alpha''(\vec{x}_2)}}$$

The fields $E(\vec{x}_1, t)e^{i\varphi_{P1}}$, $E(\vec{x}_1, t)e^{i\varphi_{P2}}$ interfere with one another, producing an interference pattern, the average intensity Im1 of which (herein also defined with the symbol <I>), measured in the center of the interference pattern (along the optical axis) on the plane containing the photodiode 1, is in relation to the cosine of the phase difference $\Delta P$ of the fields themselves according to the following relationship [2]:

$$\cos(\Delta P) = (\langle I \rangle - I_{P1} - I_{P2})/(2(I_{P1} I_{P2})^{1/2})$$

where $I_{P1}$ and $I_{P2}$ are the intensities of the fields $E(\vec{x}_1, t)e^{i\varphi_{P1}}$, $E(\vec{x}_1, t)e^{i\varphi_{P2}}$, respectively.

The phase difference $\Delta R$ of the fields in the section E of the interferometer on the photodiode 2 is expressed by means of the equation:

$$\Delta R \propto l_0(\theta_2 - \theta_1) + \varphi(\vec{x}_2) - \varphi'(\vec{x}_1) + \alpha(\vec{x}_2) - \alpha$$
$$(\vec{x}_1) + \varphi_{R2} - \varphi_{R1}$$

The phase difference $\Delta P$ of the fields in the section F of the interferometer on the photodiode 1, for the various combinations of the digital modulating functions a(t) b(t), is:

CASE $a(t)=0, b(t)=0$

The amplitudes of the main beams are canceled and therefore the phase difference is indeterminable.

CASE $a(t)=1, b(t)=0$ only the first main beam with angular momentum L1 is there:

$$\Delta P_{10} \propto l_1(\theta_2 - \theta_1) + \varphi(\vec{x}_2) - \varphi(\vec{x}_1) + \alpha(\vec{x}_2) - \alpha$$
$$(\vec{x}_1) + \varphi_{P2} - \varphi_{P1}$$

CASE $a(t)=0, b(t)=1$ only the second main beam with angular momentum L2 is there:

$$\Delta P_{01} \propto l_2(\theta_2 - \theta_1) + \varphi''(\vec{x}_2) - \varphi(\vec{x}_1) + \alpha''(\vec{x}_2) - \alpha''$$
$$(\vec{x}_1) + \varphi_{P2} - \varphi_{P1}$$

CASE $a(t)=1, b(t)=1$ both the main beams are there, and the following is obtained:

$$\Delta P_{11} \propto \tfrac{1}{2}[(l_2+l_1)(\theta_2-\theta_1) + \varphi(\vec{x}_1) + \varphi(\vec{x}_2) - \alpha(\vec{x}_2) - \alpha$$
$$(\vec{x}_1) + \varphi''(\vec{x}_2) - \varphi''(\vec{x}_1) + \alpha''(\vec{x}_2) - \alpha''$$
$$(\vec{x}_1) + \varphi_{P2} - \varphi_{P1}].$$

By calculating the phase difference $\Delta P/k - \Delta R/k'$ for all the possible combinations of the modulating signals, the following is obtained:

CASE $a(t)=0, b(t)=0$

The amplitudes of the main beams are canceled and therefore the phase difference is indeterminable.

CASE $a(t)=1, b(t)=0$ the following equation [3] holds:

$$\frac{\Delta P_{10}}{k} - \frac{\Delta R}{k'} \propto \left[\frac{l_1}{k} - \frac{l_0}{k'}\right](\theta_2 - \theta_1) + \frac{\varphi_{P2} - \varphi_{P1}}{k} + \frac{\varphi_{R2} - \varphi_{R1}}{k'}$$

CASE $a(t)=0, b(t)=1$ the following equation [4] holds:

$$\frac{\Delta P_{01}}{k} - \frac{\Delta R}{k'} \propto \left[\frac{l_2}{k} - \frac{l_0}{k'}\right](\theta_2 - \theta_1) + \frac{\varphi_{P2} - \varphi_{P1}}{k} + \frac{\varphi_{R2} - \varphi_{R1}}{k'}$$

CASE $a(t)=1, b(t)=1$ the following equation [5] holds:

$$\frac{\Delta P_{11}}{k} - \frac{\Delta R}{k'} \propto \left[\frac{1}{2}\left(\frac{l_2}{k} + \frac{l_1}{k}\right) - \frac{l_0}{k'}\right](\theta_2 - \theta_1) + \frac{\varphi_{P2} - \varphi_{P1}}{k} + \frac{\varphi_{R2} - \varphi_{R1}}{k'}$$

As already shown above, advantageously, the relationships are independent of the phase differences due to the positional inclinations and distortions of the propagating wavefront, which may be eliminated by virtue of the presence of the reference beam.

Now, from the equations [3], [4] and [5], the value of the phase difference $\Delta P$ for the various combinations of the modulating functions a(t), b(t) are obtained.

CASE $a(t)=0, b(t)=0$

The amplitudes of the main beams are canceled and therefore the phase difference is indeterminable;

CASE $a(t)=1, b(t)=0$ the following equation holds:

$$\Delta P_{10} \propto \left[l_1 - \frac{k l_0}{k'}\right](\theta_2 - \theta_1) + \text{cost}$$

CASE $a(t)=0, b(t)=1$ the following equation holds:

$$\Delta P_{01} \propto \left[l_2 - \frac{k l_0}{k'}\right](\theta_2 - \theta_1) + \text{cost}$$

CASE $a(t)=1, b(t)=1$ the following equation holds:

$$\Delta P_{11} \propto \left[\frac{1}{2}(l_2+l_1) - \frac{kl_0}{k'}\right](\theta_2-\theta_1) + \text{cost}$$

where "cost" is a constant expressed by the equation:

$$\text{cost} = \frac{k\Delta R}{k'} + \varphi_{P2} - \varphi_{P1} + \frac{k(\varphi_{R2}-\varphi_{R1})}{k'}.$$

The quantity $\Delta R$, in the various combinations, is a constant quantity which may be chosen by modifying the value of the setting signal SP of the PID control.

Such a quantity $\Delta R$ also remains constant as the positional tilt, the phase difference due to the positional inclinations and to the distortions of the propagating wavefront, vary by virtue of the negative feedback of the PID control.

Furthermore, also the quantities $(k/k')(\varphi_{R2}-\varphi_{R1})$ and $\varphi_{P2}-\varphi_{P1}$ are constant, since they depend on the optical path along the branches of the interferometer and, therefore, on purely geometric and construction parameters.

As a result, the quantities $\Delta P_{10}$, $\Delta P_{01}$, $\Delta P_{11}$ may be set at three different values simply by suitably selecting the topological charges $I_0$, $I_1$, $I_2$ (i.e., the respective orbital angular momentums $L_0$, $L_1$, $L_2$) of the reference beam and of the two main beams.

The values $\Delta P_{10}$, $\Delta P_{01}$, $\Delta P_{11}$ must also be selected so that they produce average intensities detected on photodiode 1 with as many different known and predefined non-zero values $<I>_{10}$, $<I>_{01}$, $<I>_{11}$, as indicated by the equation [2].

Consequently, the respective average intensities, measured upon reception, are recognizable and indicative of the modulation values 0 or 1 applied to each of the two main beams. The information encoded thereon may therefore be decoded, i.e., demodulated and recognized.

In fact, by measuring the intensity on the photodiode 1 following a preliminary calibration operation, it is possible to demodulate the information transmitted.

Calibration is required to associate with each combination a(t), b(t) the corresponding average intensity value detected on the photodiode 1 and consists of sending a known sequence of all combinations and recording the corresponding average intensity measured on the photodiode 1 by means of the processing unit.

Demodulation consists of associating the respective combination with each intensity measured on the photodiode 1, as defined by the previous calibration. Such an association may be made by the same processing unit used during the calibration step.

Obviously, the system is designed so that the quantities $I_{P1}$, $I_{P2}$, and $\Delta P$ produce, in the various conditions of use, a one-to-one dependence between the combinations of the modulating functions a(t) b(t) and the average intensity measured on the photodiode 1.

For stationary applications, the calibration may be performed only once or periodically to compensate for any drifts. For non-stationary applications the calibration must be performed periodically also using specific telecommunication protocols.

There is still to be recognized the status a(t)=0, b(t)=0, the phase of which is undetermined (as shown above). This combination is identified deterministically when the intensity on the photodiode 1 is canceled, $<I>_{00}=0$.

It should be noted that, in the description of this example, two main beams with two modulating functions are used.

In other possible implementations, however, the main beams and the respective modulating functions may be more.

In fact, by appropriately choosing the orbital angular momentums of the main beams, it is possible to ensure that the phase differences $\Delta P$, in the various combinations of the modulating functions, are different.

In the case of the interferometer, it is also necessary to ensure that the relative average intensities $<I>$, calculated by replacing each $\Delta P$ in the equation [2], are different from each other and therefore recognizable.

In accordance with another embodiment, shown in FIG. 8, a balanced interferometer is employed.

The functioning of the balanced interferometer corresponds to that of the unbalanced interferometer (FIG. 7) with regard to what occurs following the beam splitter.

In this configuration, the beam of branch A, before being divided into the two beams along the branches C and D (as in the configuration with the unbalanced interferometer), is reflected by a semi-reflective plate 46 and travels along section G, while the beam B, before being divided into the two beams along the branches C and D (as in the configuration with an unbalanced interferometer) hits a second mirror 48, crosses a compensating plate 47, is reflected by the semi-reflective plate 46 towards a third mirror 49, is reflected by the mirror 49 towards the semi-reflective plate 46 and travels along section G.

The advantage of this configuration is that, by suitably positioning the mirrors 42, 48, 49, it is possible to ensure that the optical path from $\vec{x}_1$ to G is equal to the sum between the optical path from $\vec{x}_2$ to G and twice the optical path of the section B'.

This implies that the phase differences $\varphi_{P2}-\varphi_{P1}$ and $\varphi_{R2}-\varphi_{R1}$, advantageously, cancel each other out, and therefore it is no longer necessary to satisfy the relationship, already previously reported: $\Delta L < c/\Delta u$.

The compensating plate 47 is used to compensate the optical path inside the semi-reflective plate 46 (as is done, for example, in other types of interferometers, for example, the Michelson interferometer).

In accordance with another embodiment, shown in FIG. 9, a compensation of the setting signal SP is employed.

According to the relationship [1], a constant average intensity $<I>$ corresponds to a constant phase $\Delta R$, but this occurs only if the two quantities $I_{R1}$ and $I_{R2}$ are substantially constant.

However, in non-stationary applications, it is possible that such quantities change appreciably and must be compensated to keep the phase difference $\Delta R$ of the reference beam constant.

To do this it is possible to act on the setting signal SP of the PID control.

As shown in FIG. 9, it is sufficient to take part of the beam hitting the openings Z1 and Z2 using two semi-reflective plates 66, 67, two laser-line filters 68, 69 with a wavelength coinciding with the wavelength of the reference beam used in transmission, two photodiodes 63, 64 and two amplifiers 73, 74.

The voltage value of the setting signal SP to be applied to the PID controller for compensation is determined according to the following relationship:

$$V_{setpoint} = G<I> = GI_{R1} + GI_{R2} + 2\cos(\Delta R)\sqrt{GI_{R1}GI_{R2}}$$

$GI_{R1}$ and $GI_{R2}$ are the voltage values of the signal at the output of the amplifiers proportional to the intensities $I_{R1}$ and $I_{R2}$, respectively, where G is a constant of proportionality.

G <I> is the voltage value measured at the output of the amplifier 71 (see FIG. 7) proportional (or corresponding) to the first electrical signal V1 and to the intensity <I> with G being the constant of proportionality, while ΔR it is the value of the phase difference which is to be kept constant. The calculation may be carried out by means of a processing unit 65 (which may correspond to the processing unit configured to obtain the demodulated functions a(t) and b(t), or it may be carried out using an additional processor).

As it may be noticed, the object of the present invention is fully achieved by the systems and methods shown above, by virtue of the functional and structural features thereof.

In fact, the system and method for transmitting and receiving electromagnetic beams, illustrated above, is capable of detecting, precisely and reliably, the orbital angular momentum of the received beam, in a manner independent of the positional tilts of the receivers and independent of the distortions suffered by the beam during propagation.

This is achieved by virtue of a double spatial detection, in two different points, of a composite beam, comprising, in addition to the beam to be investigated, also a further reference beam.

The possibility of precisely and reliably detecting the orbital angular momentum of the received beam is, in turn, advantageously applicable in a plurality of different applications, including, for example, the characterization of the beam and the utilization of the angular momentum variable for telecommunications purposes.

With reference to telecommunication applications, the method and the system of the present invention allow to utilize the orbital angular momentum variable as an additional degree of freedom, advantageously usable both for modulating signals and for multiplexing the same.

In particular, the orbital angular momentum provides an additional level of multiplexing (with consequent, apparent advantages), allowing to group signals which are identical from the point of view of the other multiplexing variables (for example, time or frequency) and which may be discriminated based on the different orbital angular momentum.

Furthermore, the invention provides an effective method for locally demultiplexing and demodulating amplitude-modulated signals grouped by means of multiplexing in the orbital angular momentum variable.

Such demultiplexing and demodulation is, advantageously, local, since it may be performed by detecting even a small portion of the wavefront of the beam, based on a local detection.

By virtue of such a method of demultiplexing and demodulating, and of the relative system, it is possible to realize the aforesaid telecommunications method and system based on orbital angular momentum-multiplexing, managing to transfer multiple information simultaneously on a single transmission channel (with orbital angular momentum-multiplexing).

Those skilled in the art, in order to meet contingent needs, may modify and adapt the embodiments of the systems and methods described above, and replace elements with others which are functionally equivalent, without departing from the scope of the following claims. Each of the features described as belonging to a possible embodiment may be achieved irrespective of the other embodiments described.

The invention claimed is:

1. A method for demultiplexing and demodulating amplitude-modulated signals grouped by means of multiplexing in an orbital angular momentum variable, wherein a signal to be demultiplexed and demodulated comprises a composite electromagnetic radiation beam (Q1), consisting of a superposition of a reference beam (F0) and a main beam, in turn consisting of a superposition of a first modulated beam (Fm1) and at least one second modulated beam (Fm2);

wherein said first modulated beam (F1) is obtained by modulating a first piece of m1information, represented by a first modulation function a(t), on a first electromagnetic radiation beam (F1), by means of an amplitude modulation technique, and wherein said at least one second modulated beam (Fm2) is obtained by modulating at least one second piece of information, represented by a second modulation function b(t), on at least one respective second electromagnetic radiation beam (F2), by means of an amplitude modulation technique;

wherein said first electromagnetic radiation beam (F1) is characterized by a first orbital angular momentum ($L_1$), and said at least one second electromagnetic radiation beam (F2) is characterized by at least one respective second orbital angular momentum ($L_2$), wherein both the first electromagnetic radiation beam (F1) and the at least one second electromagnetic radiation beam (F2) have respective spectra in a same first frequency band, and furthermore have respective radii of curvature substantially coinciding with a first beam radius-of-curvature value, and wherein said reference electromagnetic radiation beam (F0) is characterized by a second orbital angular momentum ($L_0$), a second spectrum in a second frequency band which is distinct from said first frequency band, and a second beam radius of curvature having a value substantially coinciding with said first beam radius-of-curvature value;

wherein the method comprises the steps of:

passing said composite electromagnetic radiation beam (Q1) through two openings (Z1,Z2), so as to obtain, downstream of the first opening (Z1), a first composite beam portion (Q1(x1)) and, downstream of the second opening (Z2), a second composite beam portion (Q1(x2));

transmitting said first composite beam portion (Q1(x1)) along a first branch (A) of an interferometer (40) and said second composite beam portion (Q1(x2)) along a second branch (B) of the interferometer;

superimposing, by means of a beam splitter (41) of the interferometer, the first composite beam portion (Q1(x1)) and the second composite beam portion (Q1(x2)) along a third branch (D) of the interferometer, to obtain a respective third electromagnetic beam (D), and along a fourth branch of the interferometer (C), to obtain a respective fourth electromagnetic beam (C);

performing a frequency discrimination of the third electromagnetic beam (D) around said first frequency band, so as to obtain a third filtered electromagnetic beam (F) wherein the contributions deriving from the reference beams of the first composite beam portion (Q1(x1)) and of the second composite beam portion (Q1(x2)) have been canceled, and wherein the components deriving from the respective first modulated beam (Fm1(x1), Fm1(x2)) and at least one second modulated beam (Fm2(x1), Fm2(x2)) remain;

performing a frequency discrimination of the fourth electromagnetic beam (C) around said second frequency band of the reference beam, so as to obtain a fourth filtered electromagnetic beam (E) consisting of the superposition of the two reference beams (F0(x1), F0(x2)) belonging to the first composite beam portion (Q1(x1)) and the second composite beam portion (Q1(x2)), respectively;

detecting said third filtered electromagnetic beam (F), by means of a first beam detector (1), to generate a first electrical signal (V1), representative of an intensity of the electromagnetic radiation of the third filtered electromagnetic beam (F);

determining, based on said first electrical signal (V1), a first phase difference value ($\Delta P_{ab}$) between the component of the third filtered electromagnetic beam deriving from the first composite beam filtered portion (Fm1(xI)), Fm2(x1)) and the component of the third electromagnetic beam deriving from the second composite beam filtered portion (Fm1(x2), Fm2(x2)), at the first beam detector (1), wherein said first phase difference value ($\Delta P_{ab}$) is dependent on a value taken by the first modulation function a(t) and the second modulation function b(t);

detecting said fourth filtered electromagnetic beam (E), by means of a second beam detector (2), to generate a second electrical signal (V2), representative of an intensity of the electromagnetic radiation of the fourth filtered electromagnetic beam (E);

determining, based on said second electrical signal (V2), a second phase difference value ($\Delta R$) between the two reference beams (F0(x1), F0(x2)) belonging to the first composite beam portion (Q1(x1)) and the second composite beam portion (Q1(x2)), at the second beam detector (2); and demultiplexing and demodulating the information (a(t), b(t)) modulated on each of the first modulated beam (Fm1) and the at least one second modulated beam (Fm2), based on said first phase difference value ($\Delta P_{ab}$) and second phase difference value ($\Delta R$).

2. A method according to claim 1, wherein said step of demultiplexing and demodulating comprises:

subtracting the second phase difference value ($\Delta R$), divided by a second wave number k', from the first phase difference value ($\Delta P_{ab}$), divided by a first wave number k, to obtain a difference value (Q2=$\Delta P_{ab}$/k−$\Delta R$/k'), where the first wave number (k) is a wave number corresponding to the main beam, defined as k=$2\pi/\lambda$, $\lambda$ being the wavelength of the main beam, and where the second wave number (k') is a wave number corresponding to the reference beam, defined as being k'=$2\pi/\lambda'$, $\lambda'$ the wavelength of the reference beam, said difference value (Q2=$\Delta P_{ab}$ b/k−$\Delta R$/k') being representative of a combination of values taken by the first modulation function a(t) and the second modulation function b(t), while being independent of positional inclination conditions between said first detector and second detector and independent of phase variations due to disturbances suffered by the transmitted composite beam before reception;

demultiplexing and demodulating the modulated information on each of the first modulated beam (Fm1) and the at least one second modulated beam (Fm2), based on said determined difference value (Q2=$\Delta P_{ab}$/k−$\Delta R$/k').

3. A method according to claim 1, wherein the first electromagnetic radiation beam (F1) and the at least one second electromagnetic radiation beam (F2) are digitally amplitude-modulated, in accordance with amplitudes of the first modulation function a(t) and the at least one second modulation function b(t), and wherein the difference value (Q2=$\Delta P_{ab}$/k−$\Delta R$/k') may take a plurality of expected values, each representative of a respective combination of digital amplitude values taken by the first modulation function a(t) and the at least one second modulation function b(t).

4. A method according to claim 3, wherein:

the first electromagnetic radiation beam (F1) and the at least one second electromagnetic radiation beam (F2) are digitally amplitude-modulated, in a binary manner, and the amplitudes of the first modulation function a(t) and the at least one second modulation function b(t) may take the logical values 0 or 1;

the method comprises the further step of detecting the received power or intensity of the third filtered electromagnetic beam (F), corresponding to the first electrical signal (V1) detected by the first beam detector (1), and comparing the received power or intensity with a minimum threshold;

the determined difference (Q2=$\Delta P_{ab}$/k−$\Delta R$/k') may take a first expected value ($\Delta P_{10}$/k−$\Delta R$/k') which is dependent on the first orbital angular momentum ($L_1$), or a second expected value ($\Delta P_{01}$/k−$\Delta R$/k') which is dependent on the second orbital angular momentum ($L_2$), or a third expected value ($\Delta P_{11}$/k−$\Delta R$/k') which is dependent on a combination of the first and second orbital angular momentums;

the step of demultiplexing and demodulating the modulated information comprises:

recognizing that the first modulated beam (Fm1) carries information corresponding to 1 and the second modulated beam (Fm2) carries information corresponding to 0 if the determined difference ($\Delta P_{ab}$/k−$\Delta R$/k') takes said first expected value ($\Delta P_{10}$/k−$\Delta R$/k');

recognizing that the first modulated beam (Fm1) carries information corresponding to 0 and the second modulated beam (Fm2) carries information corresponding to 1 if the determined difference ($\Delta P_{ab}$/k−$\Delta R$/k') takes said second expected value ($\Delta P_{01}$/k−$\Delta R$/k');

recognizing that the first modulated beam (Fm1) carries information corresponding to 1 and the second modulated beam (Fm2) carries information corresponding to 1 if the determined difference ($\Delta P_{ab}$/k−$\Delta R$/k') takes said third expected value ($\Delta P_{11}$/k−$\Delta R$/k');

recognizing that the first modulated beam (Fm1) carries information corresponding to 0 and the second modulated beam (Fm2) carries information corresponding to 0 if the received power or intensity of the third filtered electromagnetic beam F is lower than said minimum threshold.

5. A method according to claim 1, wherein:

the first phase difference value ($\Delta P_{ab}$) depends on an average intensity (Im1) of the third filtered electromagnetic beam (F), associated with a respective interference pattern, and said first electrical signal (V1) is representative of said average intensity of the third filtered electromagnetic beam (F) which is detected by the first beam detector (1);

the second phase difference value ($\Delta R$) depends on an average intensity (Im2) of the fourth filtered electromagnetic beam (E), associated with a respective interference pattern, and said second electrical signal (V2)

is representative of said average intensity (Im2) of the fourth filtered electromagnetic beam (E) which is detected by the second beam detector (2); and wherein the method further comprises the step of:
keeping said average intensity (Im2) of the fourth filtered electromagnetic beam (E) constant, at a predefined intensity value, by means of a feedback control loop controlled by the second electrical signal (V2) and acting on the first composite beam portion (Q1(x1)), so that the second phase difference value (ΔR) remains constant, being set at a predefined value.

6. A method according to claim 5, wherein the first electromagnetic radiation beam (F1) and the at least one second electromagnetic radiation beam (F2) are digitally amplitude-modulated, in accordance with amplitudes of the first modulation function a(t) and the at least one second modulation function b(t), and wherein the first phase difference value=$\Delta P_{ab}$ may take a plurality of expected values, each representative of a respective combination of digital amplitude values taken by the first modulation function a(t) and the at least one second modulation function b(t).

7. A method according to claim 6, wherein:
the first electromagnetic radiation beam (F1) and the at least one second electromagnetic radiation beam (F2) are digitally amplitude-modulated, in a binary manner, and the amplitudes of the first modulation function a(t) and the at least one second modulation function b(t) may take the logical values 0 or 1;
the method comprises the further step of detecting the received power or intensity of the third filtered electromagnetic beam (F), corresponding to the first electrical signal (V1) detected by the first beam detector (1), and comparing the received power or intensity with a minimum threshold;
the first phase difference value ($\Delta P_{ab}$) determined may take a first expected value ($\Delta P_{10}$) which is dependent on the first orbital angular momentum ($L_1$), or a second expected value ($\Delta P_{01}$) which is dependent on the second orbital angular momentum ($L_2$), or a third expected value ($\Delta P_{11}$) which is dependent on a combination of the first and second orbital angular momentums;
the step of demultiplexing and demodulating the modulated information comprises:
recognizing that the first modulated beam (Fm1) carries information corresponding to 1 and the second modulated beam (Fm2) carries information corresponding to 0 if the first phase difference value ($\Delta P_{ab}$) determined takes said first expected value ($\Delta P_{10}$);
recognizing that the first modulated beam (Fm1) carries information corresponding to 0 and the second modulated beam (Fm2) carries information corresponding to 1 if the first phase difference value ($\Delta P_{ab}$) determined takes said second expected value ($\Delta P_{01}$);
recognizing that the first modulated beam (Fm1) carries information corresponding to 1 and the second modulated beam (Fm2) carries information corresponding to 1 if the first phase difference value ($\Delta P_{ab}$) determined takes said third expected value ($\Delta P_{11}$);
recognizing that the first modulated beam (Fm1) carries information corresponding to 0 and the second modulated beam (Fm2) carries information corresponding to 0 if the received power or intensity of the third filtered electromagnetic beam F is lower than said minimum threshold.

8. A method according to claim 5, wherein the step of keeping the average intensity (Im2) of the fourth filtered electromagnetic beam (E) constant comprises:
controlling, by means of a control unit (61), which receives as an input the second electrical signal (V2) and a setting signal (SP), a first mirror (42) which is hit by the first composite beam portion (Q1(x1)), to vary, in a controlled manner, a length of the optical path A traversed by the first composite beam portion (Q1(x1)) and, consequently, to vary a phase shift of said first (Q1(x1) and second (Q2(x2) electromagnetic beam portion, so as to modify the average intensity (Im2) detected by the second detector (2) in a controlled manner which is dependent on the second electrical signal (V2) and on the setting signal (SP), so as to keep the second phase difference value (ΔR), and the average intensity (Im2) of the fourth filtered electromagnetic beam (E) constant, set at respective predefined values which are dependent on the setting signal (SP).

9. A method according to claim 8, wherein the step of keeping the average intensity (Im2) of the fourth filtered electromagnetic beam (E) constant comprises compensating variations of an intensity ($I_{R1}$) of the reference beam associated with the first composite beam portion, at the second beam detector (2), and variations of an intensity ($I_{R2}$) of the reference beam associated with the second composite beam portion, at the second beam detector (2),
wherein said step of compensating comprises:
deflecting a part of the beam corresponding to the first composite beam portion (Q1(x1)) at the first branch (A) of the interferometer;
detecting, by means of a third beam detector (63) an intensity of the deflected part of the beam corresponding to the first composite beam portion (Q1(x1), and generating a first compensation electrical signal ($GI_{R1}$) representative of the intensity of the first composite beam portion;
deflecting a part of the beam corresponding to the second composite beam portion (Q1(x2) at the second branch (B) of the interferometer;
detecting, by means of a fourth beam detector (64) an intensity of the second beam composite portion, and generating a second compensation electrical signal ($GI_{R2}$) representative of the intensity of the second beam composite portion;
modifying the setting signal (SP), by a processing unit (65), based on the first compensation electrical signal ($GI_{R1}$) and the second compensation electrical signal ($GI_{R2}$).

10. A method according to claim 1, wherein a number of modulated beams, which are orbital-angular-momentum-multiplexed, is equal to N, greater than two,
each modulated beam being characterized by a respective orbital angular momentum ($L_1$) and being amplitude-modulated by a respective modulating function,
and wherein each of the possible value combinations of the modulating functions on the N modulated beams corresponds to a respective value of first phase difference ($\Delta P_{a1 \ldots aN}$) and/or to a respective difference value ($Q2=\Delta P_{a1 \ldots aN}/k-\Delta R/k'$).

11. A method according to claim 1, further comprising the steps of:
arranging a first additional optical path (A, G) for the first composite beam portion (Q1(x1)), and arranging a second additional optical path (B, B', B', G) for the second composite beam portion (Q1(x2)), before the superposition of the first and of the second composite beam portion, in the interferometer;

wherein said first additional optical path (A, G) and second additional optical path (B, B', B', G) are predefined and sized so as to cancel a phase difference ($\phi_{P2}-\phi_{P1}$) which results between the phase of the second composite beam portion (Q1(x2)) and the phase of the first composite beam portion (Q1(x1)) due to the overall optical path difference between the respective inlet opening and the first beam detector (1), and so as to cancel the phase difference ($\phi_{R2}-\phi_{R1}$) which results between the phase of the second composite beam portion (Q1(x2)) and the phase of the first composite beam portion (Q1(x1)) due to the overall optical path difference between the respective inlet opening and the second beam detector (2).

12. A method according to claim 1, wherein all said electromagnetic beams are optical beams and/or laser beams, and/or wherein the orbital angular momentum of the reference beam is known at all times.

13. A method according to claim 12, wherein the orbital angular momentum of the reference beam takes the constant value $L_0=0$.

14. A method according to claim 1, wherein the second frequency band is substantially monochromatic, and/or wherein the second frequency band is adjacent to the first frequency band.

15. A method according to claim 1, wherein the steps of performing a frequency discrimination of the first or second electrical signal of composite beam comprise performing a frequency filtering.

16. A system for demultiplexing and demodulating (100) amplitude-modulated signals grouped by means of multiplexing in an orbital angular momentum variable, wherein a signal to be demultiplexed and demodulated comprises a composite electromagnetic radiation beam (Q1), consisting of a superposition of a reference beam (F0) and a main beam, in turn consisting of a superposition of a first modulated beam (Fm1) and at least one second modulated beam (Fm2);

wherein said first modulated beam (F1) is obtained by modulating a first piece of m1 information, represented by a first modulation function a(t), on a first electromagnetic radiation beam (F1), by means of any an amplitude modulation technique, and wherein said at least one second modulated beam (Fm2) is obtained by modulating at least one second piece of information, represented by a second modulation function b(t), on at least one respective second electromagnetic radiation beam (F2), by means of any an amplitude modulation technique;

wherein said first electromagnetic radiation beam (F1) is characterized by a first orbital angular momentum ($L_1$), and said at least one second electromagnetic radiation beam (F2) is characterized by at least one respective second orbital angular momentum ($L_2$), wherein both the first electromagnetic radiation beam (F1) and the at least one second electromagnetic radiation beam (F2) have respective spectra in a same first frequency band, and furthermore have respective radii of curvature substantially coinciding with a first beam radius-of-curvature value, and wherein said reference electromagnetic radiation beam (F0) is characterized by a second orbital angular momentum ($L_0$), a second spectrum in a second frequency band which is distinct from said first frequency band, and a second beam radius of curvature having a value substantially coinciding with said first beam radius-of-curvature value;

wherein the system (100) comprises a screen equipped with two openings (Z1, Z2), configured to let said composite electromagnetic radiation beam (Q1) pass through said two openings (Z1, Z2) so as to obtain downstream of the first opening (Z1) a first composite beam portion (Q1(x1)) and downstream of the second opening (Z2) a second composite beam portion (Q1(x2));

an interferometer (40) arranged downstream with respect to the two openings (Z1, Z2), comprising:

a first interferometer branch (A), configured to be traversed by said first composite beam portion (Q1(x1));

transmitting said first composite beam portion (Q1(x1)) along a first branch (A) of an interferometer (40) and said second composite beam portion (Q1(x2)) along a second branch (B) of the interferometer;

a second interferometer branch (B), configured to be traversed by said second composite beam portion (Q1(x2)); —a beam splitter (41), configured to superimpose the first composite beam portion (Q1(x1)) and the second composite beam portion (Q1(x2)) along a third branch (D) of the interferometer, to obtain a respective third electromagnetic beam (D), and along a fourth branch of the interferometer (C), to obtain a respective fourth electromagnetic beam (C);

performing a frequency discrimination of the third electromagnetic beam (D) around said first frequency band, so as to obtain a third filtered electromagnetic beam (F) wherein the contributions deriving from the reference beams of the first composite beam portion (Q1(x1)) and of the second composite beam portion (Q1(x2)) have been canceled, and wherein the components deriving from the respective first modulated beam (Fm1(x1), Fm1(x2)) and at least one second modulated beam (Fm2(x1), Fm2(x2)) remain;

first frequency discrimination means (45) configured to discriminate in frequency the third electromagnetic beam (D) around said first frequency band, so as to obtain a third filtered electromagnetic beam (F) wherein the contributions deriving from the reference beams of the first composite beam portion (Q1(x1)) and of the second composite beam portion (Q1(x2)) have been canceled, and wherein the components deriving from the respective first modulated beam (Fm1(x1), Fm1(x2)) and at least one second modulated beam (Fm2(x1), Fm2(x2)) remain;

second frequency discrimination means (44) configured to discriminate in frequency the fourth electromagnetic beam (C) around said second frequency band of the reference beam, so as to obtain a fourth filtered electromagnetic beam (E) consisting of the superposition of the two reference beams (F0(x1), F0(x2)) belonging to the first composite beam portion (Q1(x1)) and the second composite beam portion (Q1(x2)), respectively;

a first beam detector (1), configured to detect said third filtered electromagnetic beam (F), to generate a first electrical signal (V1), representative of an intensity of the electromagnetic radiation of the third filtered electromagnetic beam (F);

a second beam detector (2), configured to detect said fourth filtered electromagnetic beam (E), to generate a second electrical signal (V2), representative of an intensity of the electromagnetic radiation of the fourth filtered electromagnetic beam (E);

processing means (65), configured to:

determine, based on said first electrical signal (V1), a first phase difference value ($\Delta P_{ab}$) between the component of the third filtered electromagnetic beam deriving from the first composite beam filtered portion (Fm1(xI)), Fm2($x1$)) and the component of the third electromagnetic beam deriving from the second composite beam filtered portion (Fm1($x2$), Fm2($x2$)), at the first beam detector (1), wherein said first phase difference value ($\Delta P_{ab}$) is dependent on values taken by the first modulation function a(t) and the second modulation function b(t);

determine, based on said second electrical signal (V2), a second phase difference value ($\Delta R$) between the two reference beams (F0($x1$), F0($x2$)) belonging to the first composite beam portion (Q1($x1$)) and the second composite beam portion (Q1($x2$)), at the second beam detector (2); and demultiplex and demodulate the information (a(t), b(t)) modulated on each of the first modulated beam (Fm1) and the at least one second modulated beam (Fm2), based on said first phase difference value ($\Delta P_{ab}$) and second phase difference value ($\Delta R$).

17. A system (100) according to claim 16, further comprising:

a control unit (61) adapted to receive as an input the second electrical signal (V2) and a setting signal (SP), an actuator (43) controlled by the control unit (61), a first mirror (42), controlled by the actuator (43), and arranged so that the first composite beam portion (Q1($x1$)) hits it;

wherein the control unit (61) is configured to vary, in a controlled manner, the length of an optical path (A) traversed by the first composite beam portion (Q1($x1$)) and, consequently, to vary a phase shift of said first (Q1($x1$) and second (Q2($x2$)) electromagnetic beam portion, so as to modify the average intensity (Im2) detected by the second detector (2) in a controlled manner which is dependent on the second electrical signal (V2) and on the setting signal (SP), so as to keep the second phase difference value ($\Delta R$), and the average intensity (Im2) of the fourth filtered electromagnetic beam (E) constant, set at respective predefined values which are dependent on the setting signal (SP).

18. A system (100) according to claim 17, further comprising means for balancing the optical paths (46, 47, 48, 49) configured to:

arrange a first additional optical path (A, G) for the first composite beam portion (Q1($x1$)), and arranging a second additional optical path (B, B', B', G) for the second composite beam portion (Q1($x2$)), before the superposition of the first and of the second composite beam portion, in the interferometer;

wherein said first additional optical path (A, G) and second additional optical path (B, B', B', G) are predefined and sized so as to cancel a phase difference ($\phi_{P2}-\phi_{P1}$) which results between the phase of the second composite beam portion (Q1($x2$)) and the phase of the first composite beam portion (Q1($x1$)) due to the overall optical path difference between the respective inlet opening and the first beam detector (1), and so as to cancel the phase difference ($\phi_{R2}-\phi_{R1}$) which results between the phase of the second composite beam portion (Q1($x2$)) and the phase of the first composite beam portion (Q1($x1$)) due to the overall optical path difference between the respective inlet opening and the second beam detector (2).

19. A system (100) according to claim 18, wherein said means for balancing the optical paths comprise:

a second mirror (48), a compensating plate (47), a semi-reflective plate (46) and a third mirror (49) arranged along a path of the second composite beam portion (Q1($x2$)) along the second branch (B) of the interferometer, so as to form said second additional optical path (B, B', B',G);

wherein said semi-reflective plate (46) is further arranged also along the path of the first composite beam portion (Q1($x2$)), and is configured to transmit said first composite beam portion (Q1($x1$)) and said second composite beam portion (Q1($x2$)) to the beam splitter (41).

20. A system according to claim 16, further comprising beam intensity compensation means, configured to compensate variations of an intensity ($I_{R1}$) of the reference beam associated with the first composite beam portion, at the second beam detector (2), and variations of an intensity ($I_{R2}$) of the reference beam associated with the second composite beam portion, at the second beam detector (2), wherein said beam intensity compensation means comprise:

a first semi-reflective plate (66) configured to deflect a part of the beam corresponding to the first composite beam portion (Q1($x1$)) at the first branch (A) of the interferometer;

a first narrow-band optical bandpass filter (68) configured to filter the deflected part of the beam corresponding to the first composite beam portion (Q1($x1$), around said second frequency band of the reference beam;

a third beam detector (63) configured to detect an intensity of the deflected part of the beam corresponding to the first composite beam portion (Q1($x1$)), and generate a first compensation electrical signal ($GI_{R1}$) representative of the intensity of the first beam portion;

a second semi-reflective plate (67) configured to deflect a part of the beam corresponding to the second composite beam portion (Q1($x2$)) at the second branch (B) of the interferometer;

a second optical bandpass filter (69) configured to filter the deflected part of the beam corresponding to the second composite beam portion (Q1($x2$)), around said second frequency band of the reference beam;

a fourth beam detector (64) configured to detect an intensity of the deflected part of the beam corresponding to the second composite beam portion (Q1($x2$)), and generate a second compensation electrical signal ($GI_{R2}$) representative of the intensity of the second beam portion;

a processing unit (65), configured to modify the setting signal (SP), based on the first compensation electrical signal ($GI_{R1}$) and the second compensation electrical signal ($GI_{R2}$).

\* \* \* \* \*